(12) United States Patent
Go et al.

(10) Patent No.: US 12,556,261 B2
(45) Date of Patent: Feb. 17, 2026

(54) METHOD AND DEVICE FOR UPLINK TRANSMISSION AND RECEPTION IN WIRELESS COMMUNICATION SYSTEM

(71) Applicant: LG ELECTRONICS INC., Seoul (KR)

(72) Inventors: Seongwon Go, Seoul (KR); Jiwon Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 265 days.

(21) Appl. No.: 18/551,387

(22) PCT Filed: Mar. 30, 2022

(86) PCT No.: PCT/KR2022/004473
§ 371 (c)(1),
(2) Date: Sep. 19, 2023

(87) PCT Pub. No.: WO2022/211472
PCT Pub. Date: Oct. 6, 2022

(65) Prior Publication Data
US 2024/0178903 A1 May 30, 2024

(30) Foreign Application Priority Data
Mar. 31, 2021 (KR) .................. 10-2021-0041793

(51) Int. Cl.
*H04B 7/06* (2006.01)
*H04B 7/0408* (2017.01)
(Continued)

(52) U.S. Cl.
CPC ....... *H04B 7/06964* (2023.05); *H04B 7/0408* (2013.01); *H04L 5/0053* (2013.01); *H04W 72/21* (2023.01)

(58) Field of Classification Search
CPC .............. H04B 7/06964; H04B 7/0408; H04B 7/06968; H04L 5/0053; H04L 5/005;
(Continued)

(56) References Cited

U.S. PATENT DOCUMENTS

2018/0234960 A1 8/2018 Nagaraja et al.
2020/0100179 A1* 3/2020 Zhou ................. H04W 72/23
(Continued)

FOREIGN PATENT DOCUMENTS

| EP | 3648369 | 5/2020 |
|---|---|---|
| KR | 102155204 | 9/2020 |
| WO | 2021034672 | 2/2021 |

OTHER PUBLICATIONS

PCT International Application No. PCT/KR2022/004473, International Search Report dated Jul. 14, 2022, 2 pages.
(Continued)

*Primary Examiner* — Harry H Kim
(74) *Attorney, Agent, or Firm* — LEE, HONG, DEGERMAN, KANG & WAIMEY

(57) ABSTRACT

A method and a device for uplink transmission and reception in a wireless communication system are disclosed. A method for uplink transmission for beam failure recovery (BFR) according to an embodiment of the present disclosure may comprise the steps of: receiving BFR-related configuration information from a base station; and performing the uplink transmission for BFR to the base station, on the basis that at least one of a first beam failure and a second beam failure is detected by counting a first beam failure instance (BFI) and a second BFI according to the assessment of radio link quality for a first BFR reference signal (RS) set and a second BFR RS set, respectively.

12 Claims, 11 Drawing Sheets

(51) Int. Cl.
  *H04L 5/00* (2006.01)
  *H04W 16/28* (2009.01)
  *H04W 24/08* (2009.01)
  *H04W 72/21* (2023.01)
  *H04W 72/231* (2023.01)
  *H04W 74/00* (2009.01)
  *H04W 74/0833* (2024.01)
  *H04W 76/19* (2018.01)

(58) Field of Classification Search
  CPC .... H04L 5/0092; H04L 5/0048; H04W 72/21; H04W 16/28; H04W 76/19; H04W 74/0833; H04W 24/08; H04W 72/231; H04W 74/004; Y02D 30/70
  See application file for complete search history.

(56) References Cited

U.S. PATENT DOCUMENTS

| | | |
|---|---|---|
| 2020/0178338 A1 | 6/2020 | Ahn et al. |
| 2020/0186218 A1 | 6/2020 | Wu et al. |
| 2020/0350972 A1 | 11/2020 | Yi et al. |
| 2022/0132517 A1* | 4/2022 | Zhu ................. H04L 5/0051 |
| 2022/0312235 A1* | 9/2022 | Zhou ................. H04B 17/17 |
| 2023/0006727 A1* | 1/2023 | Jang ............... H04B 7/06964 |
| 2023/0088597 A1* | 3/2023 | Alfarhan .......... H04B 17/318 |
| | | 370/252 |
| 2023/0328830 A1* | 10/2023 | Yi .................. H04B 7/06964 |
| | | 370/329 |

OTHER PUBLICATIONS

European Patent Office Application Serial No. 22781591.7, Search Report dated Mar. 10, 2025, 18 pages.
Korean Intellectual Property Office Application No. 10-2023-7031589, Office Action dated Sep. 26, 2025, 5 pages.
Samsung, "Enhancements on beam management for multi-TRP", R1-2008151, 3GPP TSG RAN WG1 #103, Nov. 2020, 8 pages.
3rd Generation Partnership Project (3GPP), "Technical Specification Group Radio Access Network; NR; Medium Access Control (MAC) protocol specification (Release 16)," 3GPP TS 38.321 V16.4.0, Mar. 2021, 155 pages.

* cited by examiner

METHOD AND DEVICE FOR UPLINK TRANSMISSION AND RECEPTION IN WIRELESS COMMUNICATION SYSTEM

CROSS-REFERENCE TO RELATED APPLICATION(S)

This application is the National Stage filing under 35 U.S.C. 371 of International Application No. PCT/KR2022/004473, filed on Mar. 30, 2022, which claims the benefit of earlier filing date and right of priority to Korean Application No. 10-2021-0041793, filed on Mar. 31, 2021, the contents of which are all incorporated by reference herein in their entirety.

TECHNICAL FIELD

The present disclosure relates to a wireless communication system, and in more detail, relates to a method and an apparatus for transmitting and receiving uplink for beam failure recovery in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus for supporting both a cell-specific beam failure detection/recovery procedure and a transmission reception point (TRP)-specific beam failure detection/recovery procedure for a specific cell or cell group, etc.

The technical objects to be achieved by the present disclosure are not limited to the above-described technical objects, and other technical objects which are not described herein will be clearly understood by those skilled in the pertinent art from the following description.

A method of uplink transmission for beam failure recovery (BFR) in a wireless communication system according to an aspect of the present disclosure may include: receiving, from a base station, configuration information related to BFR; and based on at least one of first beam failure and second beam failure being detected by counting a first beam failure instance (BFI) and a second BFI according to an assessment of radio link quality for a first BFR reference signal (RS) set and a second BFR RS set, respectively, performing, to the base station, uplink transmission for BFR. The configuration information may include information on a first PUCCH (physical uplink control channel) resource for BFR corresponding to the first BFR RS set, a second PUCCH resource for BFR corresponding to the second BFR RS set, and a PRACH (physical random access channel) resource for BFR, based on whether one of the first beam failure and the second beam failure is detected, the uplink transmission may be performed on a corresponding PUCCH resource among the first PUCCH resource and the second PUCCH resource, and based on one of the first beam failure and the second beam failure being detected and then the other being detected within a specific time, the uplink transmission may be performed on the PRACH resource.

A method of receiving uplink transmission for beam failure recovery (BFR) in a wireless communication system according to an aspect of the present disclosure may include: transmitting, to a terminal, configuration information related to BFR; and based on at least one of first beam failure and second beam failure being detected by counting a first beam failure instance (BFI) and a second BFI according to an assessment of radio link quality for a first BFR reference signal (RS) set and a second BFR RS set, respectively, receiving, from the terminal, uplink transmission for BFR. The configuration information may include information on a first PUCCH (physical uplink control channel) resource for BFR corresponding to the first BFR RS set, a second PUCCH resource for BFR corresponding to the second BFR RS set, and a PRACH (physical random access channel) resource for BFR, based on whether one of the first beam failure and the second beam failure is detected, the uplink transmission may be performed on a corresponding PUCCH resource among the first PUCCH resource and the second PUCCH resource, and based on one of the first beam failure and the second beam failure being detected and then the other being detected within a specific time, the uplink transmission may be performed on the PRACH resource.

According to an embodiment of the present disclosure, both a cell-specific beam failure detection/recovery procedure and a transmission reception point (TRP)-specific beam failure detection/recovery procedure can be supported for a specific cell or cell group.

In addition, according to an embodiment of the present disclosure, when both a cell-specific beam failure detection/recovery procedure and a TRP (transmission reception point)-specific beam failure detection/recovery procedure are supported for a specific cell or cell group, ambiguity in an operation of a terminal can be prevented.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
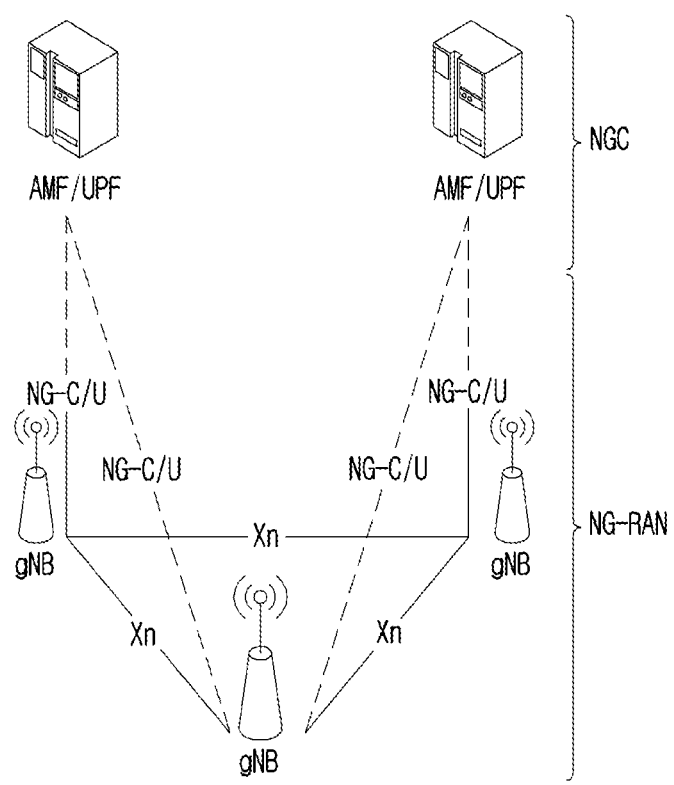
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.
  BM: beam management
  CQI: Channel Quality Indicator
  CRI: channel state information—reference signal resource indicator
  CSI: channel state information
  CSI-IM: channel state information-interference measurement
  CSI-RS: channel state information-reference signal
  DMRS: demodulation reference signal
  FDM: frequency division multiplexing
  FFT: fast Fourier transform
  IFDMA: interleaved frequency division multiple access
  IFFT: inverse fast Fourier transform
  L1-RSRP: Layer 1 reference signal received power
  L1-RSRQ: Layer 1 reference signal received quality
  MAC: medium access control
  NZP: non-zero power
  OFDM: orthogonal frequency division multiplexing
  PDCCH: physical downlink control channel
  PDSCH: physical downlink shared channel
  PMI: precoding matrix indicator
  RE: resource element
  RI: Rank indicator
  RRC: radio resource control
  RSSI: received signal strength indicator
  Rx: Reception
  QCL: quasi co-location
  SINR: signal to interference and noise ratio
  SSB (or SS/PBCH block): Synchronization signal block (including PSS (primary synchronization signal), SSS (secondary synchronization signal) and PBCH (physical broadcast channel))
  TDM: time division multiplexing
  TRP: transmission and reception point
  TRS: tracking reference signal
  Tx: transmission
  UE: user equipment
  ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
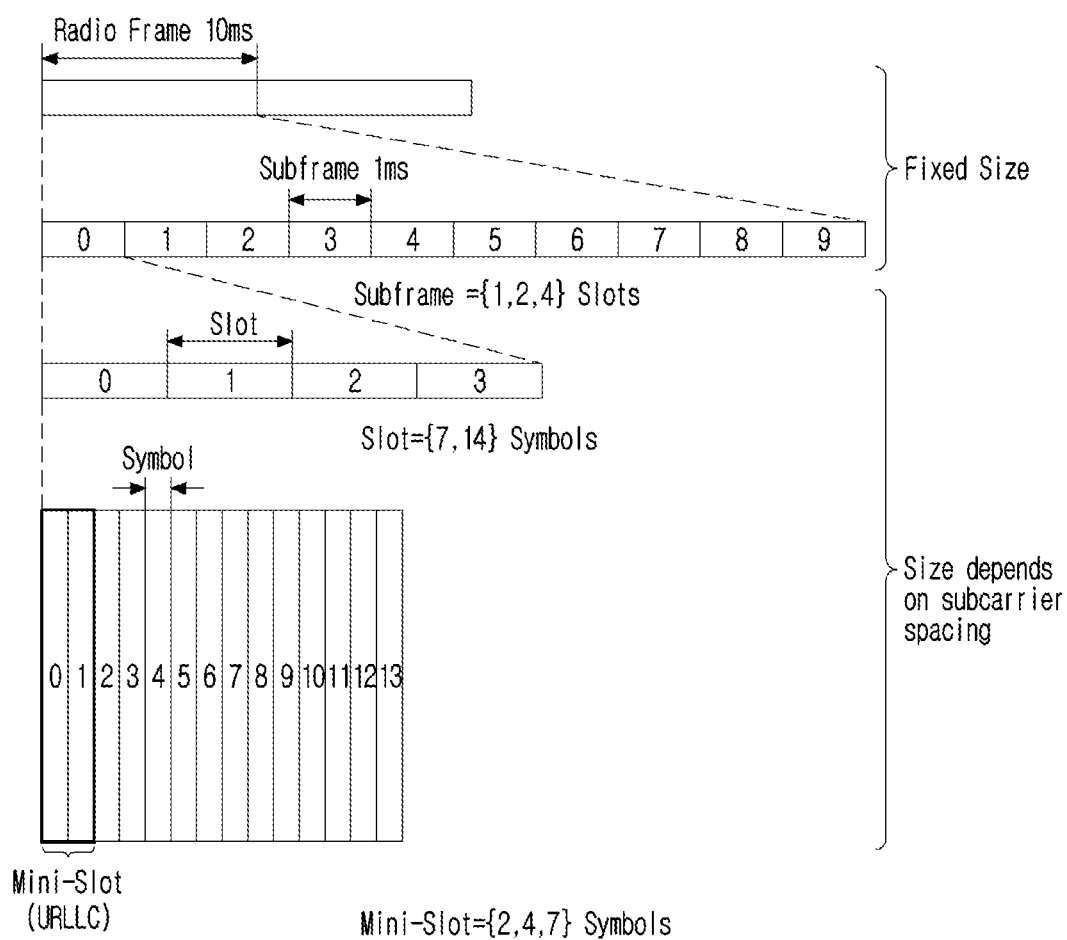
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, u). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described.

A plurality of OFDM numerologies supported in a NR system may be defined as in the following Table 1.

TABLE 1

| μ | Δf = $2^μ$ · 15 [KHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 KHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz- 7125 MHz | 15, 30, 60 kHz |
| FR2 | 24250 MHz- 52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·103 Hz and $N_f$ is 4096. Downlink and uplink transmission is configured (organized) with a radio frame having a duration of $T_f=1/(\Delta f_{max}N_f/100)$. $T_c=10$ ms. Here, a radio frame is configured with 10 subframes having a duration of $T_{sf}=(\Delta f_{max}N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_{s,f}^μ \in \{0, \ldots, N_{slot}^{subframe,μ}-1\}$ in a subframe and are numbered in an increasing order of $n_{s,f}^μ \in \{0, \ldots, N_{slot}^{frame,μ}-1\}$ in a radio frame. One slot is configured with $N_{symb}^{slot}$ consecutive OFDM symbols and $N_{symb}^{slot}$ is determined according to CP. A start of a slot $n_s^μ$ in a subframe is temporally arranged with a start of an OFDM symbol $n_s^μ N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,μ}$) and the number of slots per subframe ($N_{slot}^{subframe,μ}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,μ}$ | $N_{slot}^{subframe,μ}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
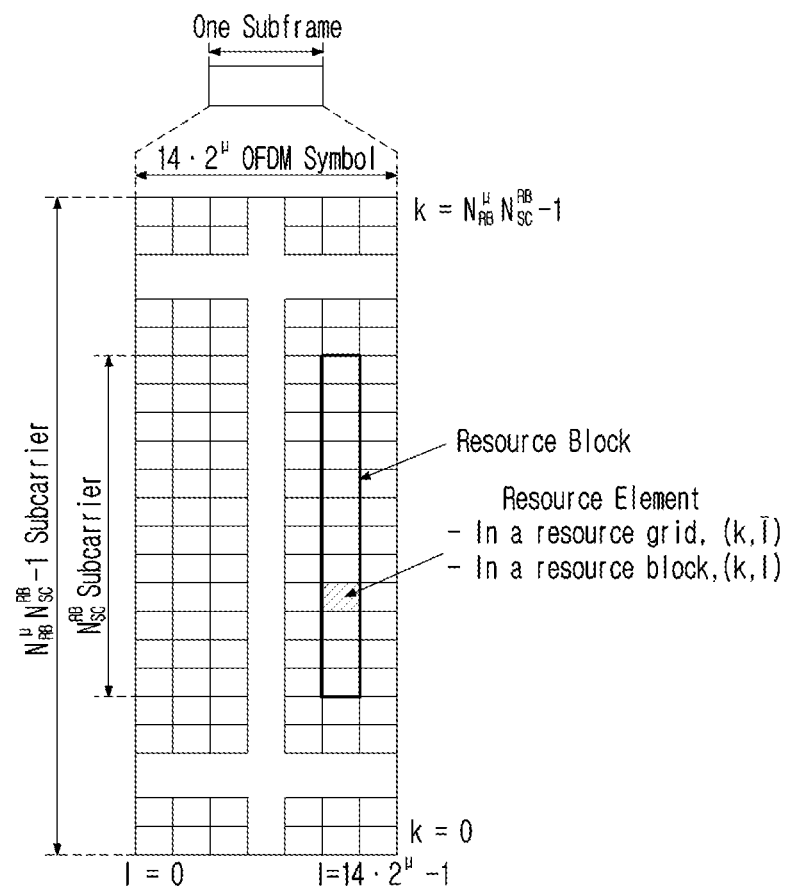
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^μ N_{sc}^{RB}$ subcarriers in a frequency domain and one subframe is configured with 14·$2^μ$ OFDM symbols, but it is not limited thereto. In an NR system, a transmitted signal is described by OFDM symbols of $2^μ N_{symb}^{(μ)}$ and one or more resource grids configured with $N_{RB}^μ N_{sc}^{RB}$ subcarriers. Here, $N_{RB}^μ \leq N_{RB}^{max,μ}$. The $N_{RB}^{max,μ}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^μ N_{sc}^{RB}-1$ is an index in a frequency domain and l'=0, . . . , $2^μ N_{symb}^{(μ)}-1$ refers to a position of a symbol in a subframe. When referring to a resource element in a slot, an index pair (k,l) is used. Here, l=0, . . . , $N_{symb}^μ-1$. A resource element (k,l') for μ and an antenna port p corresponds to a complex value, $a_{k,l'}^{(p,μ)}$. When there is no risk of confusion or when a specific antenna port or numerology is not specified, indexes p and u may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequency PointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^\mu = n_{PRB}^\mu + N_{BWP,i}^{start,\mu}$$

$N_{BWP,i}^{start,\mu}$ is a common resource block that a BWP starts relatively to common resource block 0.

Figure 4:
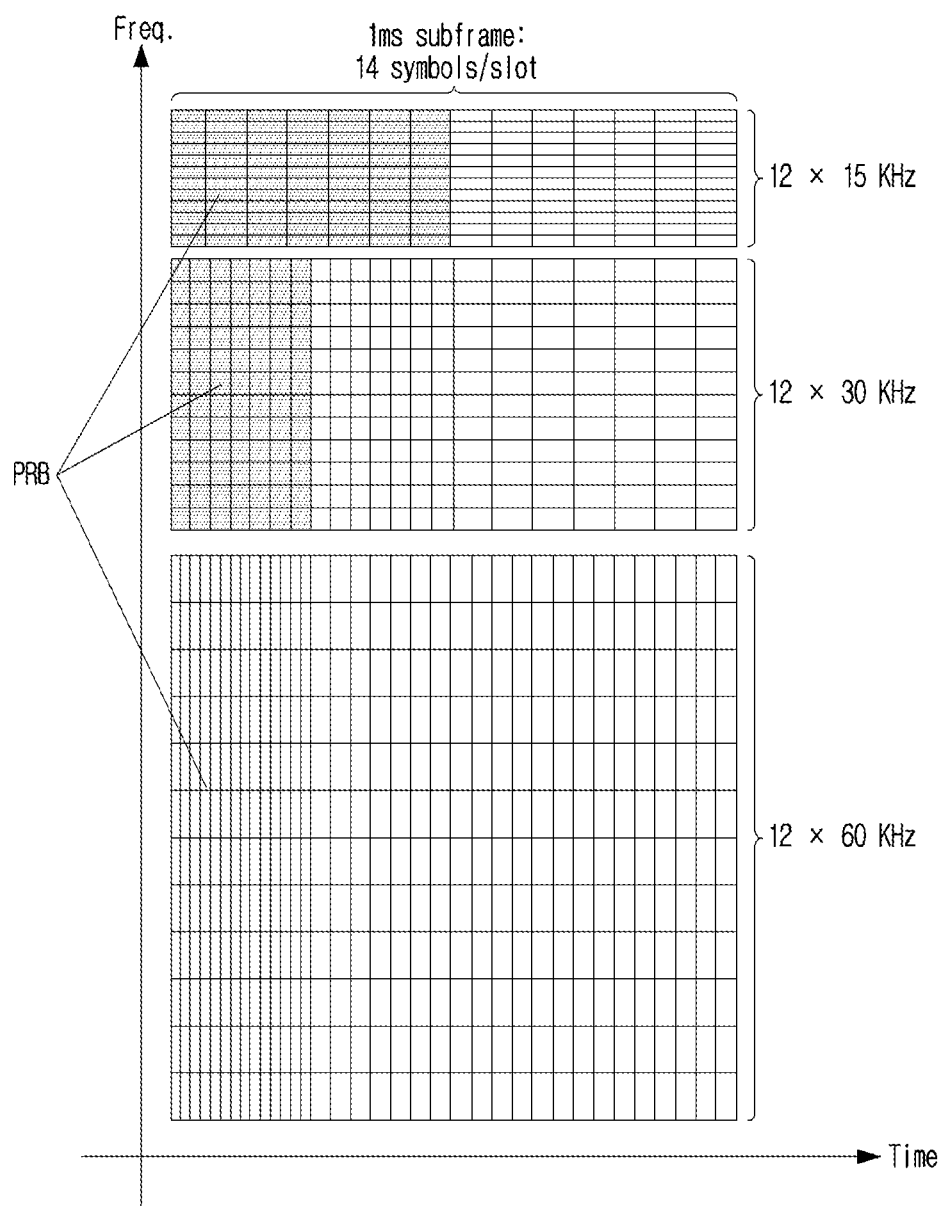
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
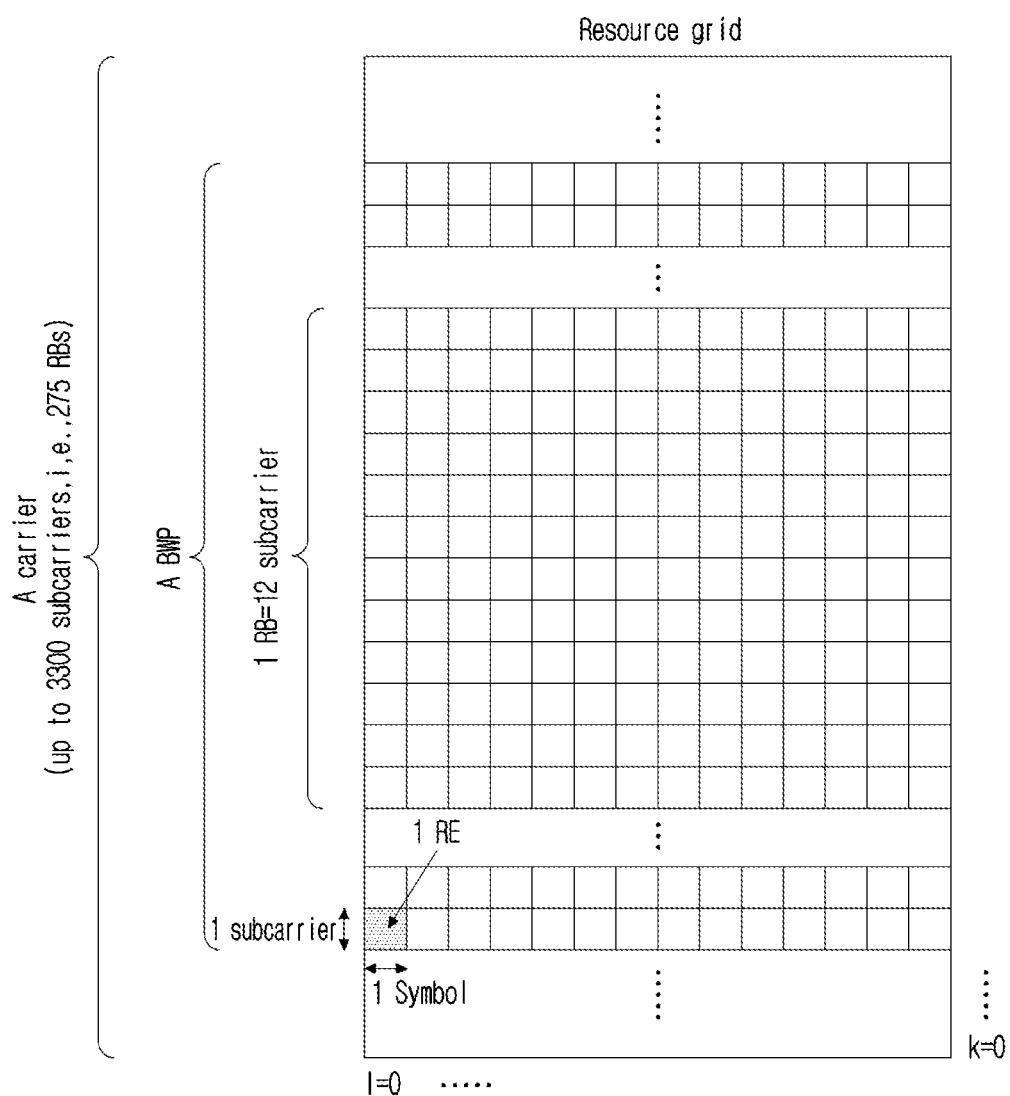
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
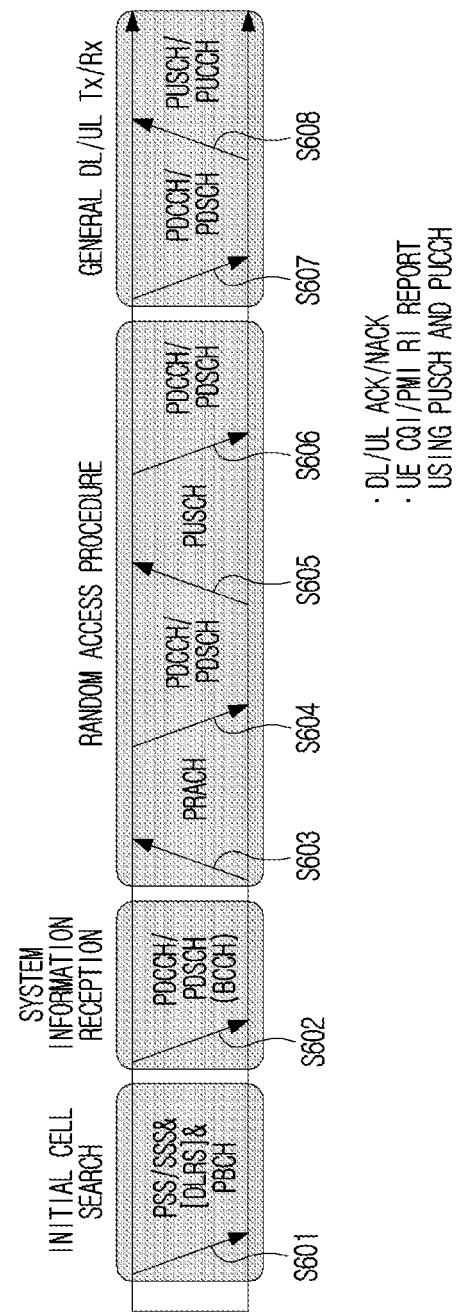
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A quasi co-location type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port(s) is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Beam Failure Recovery

In performing a DL/UL beam management process, a beam mismatch problem may occur according to a configured beam management cycle. In particular, when a terminal moves or revolves or when a wireless channel environment is changed by the movement of a surrounding object (e.g., a beam is blocked to change a LoS (line-of sight) environment into a Non-LoS environment), the optimum DL/UL beam pair may be changed. Due to such a change, when tracking fails in a beam management process generally performed by a network indication, a beam failure event may be considered to occur. Whether such a beam failure event occurs may be determined by a terminal through reception quality of a downlink reference signal (RS). And, a reporting message for such a situation or a message for a beam recovery request (referred to as a BFRQ (beam failure recovery request) message) should be transmitted from a terminal. A base station which received such a beam failure recovery request message may perform beam recovery through a variety of processes such as beam RS transmission, beam reporting request, etc. for beam recovery. These series of beam recovery processes are referred to as beam failure recovery (BFR). A Rel-15 NR standardized a BFR (beam failure recovery) process for a primary cell (PCell) or a primary secondary cell (PScell) (the two are collectively referred to as a special cell (SpCell)) that a contention based PRACH resource always exists. As an operation in a serving cell, a corresponding BFR procedure is configured as follows with a beam failure detection (BFD) process of a terminal, a BFRQ process, and a process in which a terminal monitors a response of a base station to a BFRQ.

Figure 7:
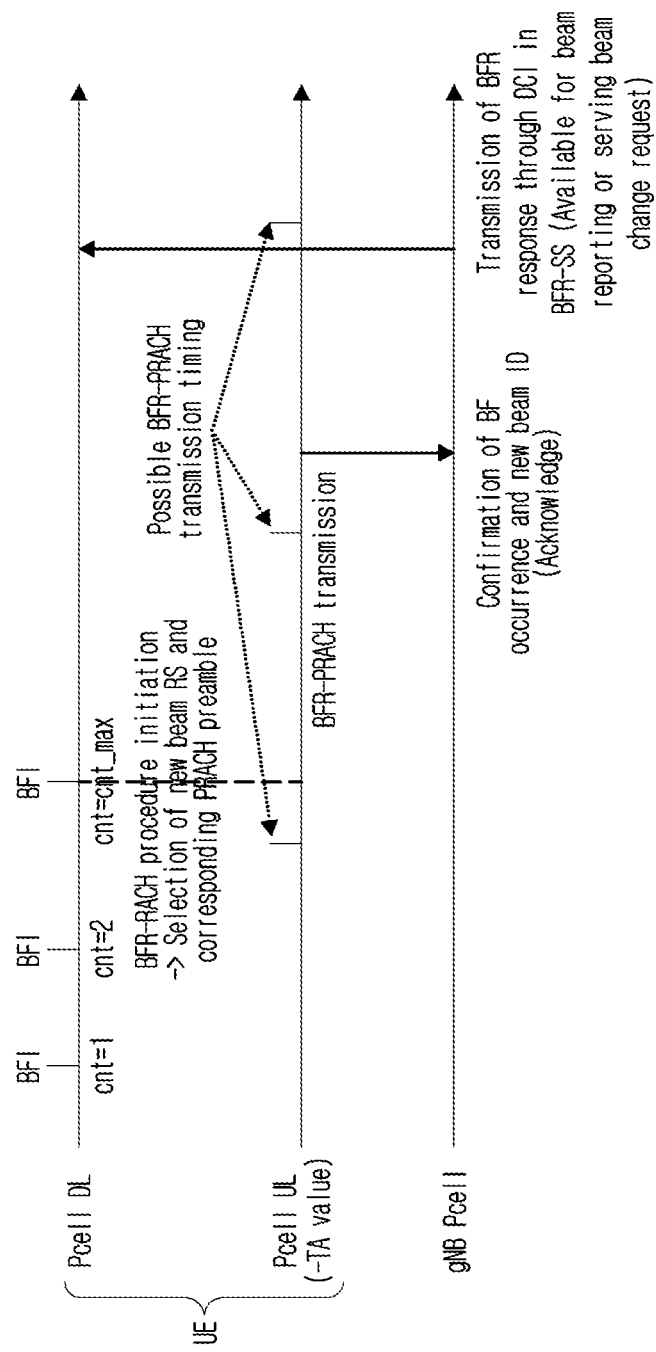
FIG. 7 is a diagram which illustrates a beam failure recovery operation for a Pcell in a wireless communication system to which the present disclosure may be applied.

FIG. 7 is a diagram which illustrates a beam failure recovery operation for a Pcell in a wireless communication system to which the present disclosure may be applied.

Hereinafter, in reference to FIG. 7, a beam failure recovery operation is described.

1) BFD (Beam Failure Detection)

When all PDCCH beams fall below a predetermined quality value (Q_out), it is said that one beam failure instance occurred. Here, quality is based on a hypothetical block error rate (BLER). In other words, it means a probability of a failure in demodulation of corresponding information when it is assumed that control information was transmitted to a corresponding PDCCH.

Here, one or a plurality of search spaces for monitoring a PDCCH may be configured to a terminal. Here, a beam may be differently configured per each search space. In this case, it means a case that all PDCCH beams for all search spaces fall below a BLER threshold. As a method for a terminal to determine a BFD RS, the following two methods are supported.

An implicit configuration for BFD RS(s): a CORESET (control resource set) ID (identifier), a resource region where a PDCCH may be transmitted, is configured in each search space. And, QCLed (Quasi Co-located) RS information for a spatial RX parameter (e.g., a CSI-RS resource ID, a SSB ID) may be indicated/configured per each CORESET ID. For example, a QCLed RS is indicated/configured by a TCI (transmit configuration information) indication in a NR standard. Here, a QCLed RS for a spatial RX parameter (e.g., QCL type D in TS38.214) means that a base station informs that a terminal equally uses (or may use) a beam used to receive a corresponding spatially QCLed RS (i.e., use the same spatial domain filter for reception) in receiving a corresponding PDCCH DMRS. Finally, from a viewpoint of a base station, it is a method of informing a terminal that transmission will be performed by applying the same transmission beam or a similar transmission beam (e.g., when a beam direction is same/similar, but a beam width is different) between spatially QCLed antenna ports. In other words, as described above, a terminal may determine (i.e., consider as the 'all PDCCH beams') as a BFD RS a QCLed (Quasi Co-located) RS for a spatial RX parameter configured to a CORESET for PDCCH reception.

An explicit configuration for BFD RS(s): a base station may explicitly configure beam RS(s) to a terminal for the purpose (beam failure detection). In this case, corresponding configured beam RS(s) correspond to the 'all PDCCH beams'.

Whenever an event occurs that a hypothetical BLER measured based on BFD RS(s) deteriorates over a specific threshold, a physical layer of a terminal informs a MAC sublayer that a beam failure instance (BFI) occurred. In a MAC sublayer of a terminal, when as many BFIs as the certain number of times (e.g., a value of a higher layer parameter, beamFailureInstanceMaxCount) occur within a certain time (i.e., within a BFD timer), a beam failure is determined (considered) to occur and a relevant RACH operation is initiated.

A MAC object operates as follows:
1> If a BFI is received from a lower layer (e.g., a physical layer):
2> Start or restart a BFD timer (beamFailureDetection-Timer);
2> Increase (increment) a BFI counter (BFI_COUNTER) by 1;
2> If a BFI counter (BFI_COUNTER) is equal to or greater than the maximum count (number of times) of BFIs (beamFailureInstanceMaxCount):
3> Initiate a Random Access procedure in a SpCell (refer to the above-described Random Access related procedure).
1> If a BFD timer (beamFailureDetectionTimer) is expired; or
1> If a BFD timer (beamFailureDetectionTimer), the maximum count (number of times) of BFIs (beamFailureInstanceMaxCount), or any reference signals used for beam failure detection is reconfigured by a higher layer (e.g., a RRC layer):
2> Set a BFI counter (BFI_COUNTER) as 0.
1> If a Random Access procedure is successfully completed:
2> Set a BFI counter (BFI_COUNTER) as 0;
2> If configured, stop a beam failure recovery timer (beamFailureRecovery Timer):
2> Consider that a Beam Failure Recovery procedure was successfully completed
2) (PRACH based) Beam Failure Recovery Request (BFRQ): New Beam Identification+PRACH Transmission As described in 1) Beam Failure Detection (BFD), when a certain number of BFIs or more occur, a terminal may determine that a beam failure occurred and perform a beam failure recovery operation. As an example of a Beam failure recovery operation, a beam failure recovery request (BFRQ) operation based on a RACH procedure (i.e., a PRACH) may be performed. Hereinafter, a corresponding BFRQ procedure is described in detail.

A base station may configure a RS list (e.g., candidate-BeamRSList) corresponding to candidate beams which may be substituted when a beam failure (BF) occurs through higher layer signaling (e.g., RRC) for a corresponding terminal. In addition, dedicated PRACH resources may be configured for corresponding candidate beams. Here, dedicated PRACH resources are non-contention based PRACH (also referred to as contention free PRACH) resources. If a terminal does not find a (proper) beam in a corresponding list, a terminal selects a contention based PRACH among preconfigured SSB resources and transmits it to a base station. A specific procedure is as follows.

Step 1) A terminal finds a beam with more than a predetermined quality value (Q_in) among RSs configured by a base station as a candidate beam RS set.
If one beam RS exceeds a threshold, a terminal selects a corresponding beam RS.
If a plurality of beam RSs exceeds a threshold, a terminal selects any one of corresponding beam RSs.
If no beam exceeds a threshold, a terminal performs the following step 2.
Here, beam quality may be based on a RSRP.
In addition, a RS beam set configured by the base station may include the following three cases. For example, all beam RSs in a RS beam set may be configured with SSBs. Alternatively, all beam RSs in a RS beam set may be configured with CSI-RS resources. Alternatively, beam RSs in a RS beam set may be configured with SSBs and CSI-RS resources.

Step 2) A terminal finds a beam with more than a predetermined quality value (Q_in) or more among SSBs (associated with a contention based PRACH resource).
If one SSB exceeds a threshold, a terminal selects a corresponding beam RS.
If a plurality of SSBs exceeds a threshold, a terminal selects any one of corresponding beam RSs.
If no beam exceeds a threshold, a terminal performs the following step 3.

Step 3) A terminal selects any SSB among SSBs (associated with a contention based PRACH resource).

A terminal transmits to a base station a preamble and a PRACH resource which is directly or indirectly associated and configured with a beam RS (CSI-RS or SSB) selected in the process.

Here, a direct association configuration is used in the following case.
When a contention-free PRACH resource and a preamble are configured for a specific RS in a candidate beam RS set which is separately configured for BFR When a preamble and a (contention based) PRACH resource mapped one-to-one with SSBs which are commonly configured for other purposes such as random access, etc. are configured Alternatively, here, an indirect association configuration is used in the following case.
When a contention-free PRACH resource and a preamble are not configured for a specific CSI-RS in a candidate beam RS set which is separately configured for BFR
Here, a terminal selects a preamble and a (contention free) PRACH resource associated with a SSB (i.e., QCLed (quasi-co-located) with respect to a spatial Rx parameter) designated to be receivable with the same Rx beam as a corresponding CSI-RS.

3) Monitoring of a Response of a Base Station to a BFRQ
A terminal monitors a response of a base station (gNB) to corresponding PRACH transmission.

Here, a response to the contention-free PRACH resource and preamble is transmitted to a PDCCH masked by a C-RNTI and a response is received in a search space (SS) which is separately configured by RRC for BFR.

Here, the search space is configured for a specific CORESET (for BFR).

For a response to a Contention PRACH, a search space and a CORESET (e.g., CORESET 0 or CORESET 1) configured for a general contention PRACH based random access process are reused as they are.

If there is no response for a certain period of time, 2) a process of identifying and selecting a new beam, and 3) a process of monitoring a response of a base station and a BFRQ are repeated.

The process may be performed until PRACH transmission reaches the preconfigured maximum number of times (N_max) or a configured timer (BFR timer) expires.

If the timer expires, a terminal stops contention free PRACH transmission, but may perform contention based PRACH transmission by a SSB selection until N_max is reached.

Improved Beam Failure Recovery (Rel-16)

As described above, Rel-15 NR standardized a PRACH based BFR process. However, it is applied only to a PCell or a PSCell due to a technical limit that any SCell may have no UL carrier in CA (carrier aggregation) and although there is a UL carrier, a contention based PRACH may not be configured. Such a limit has a limit that especially, when a SCell is operated in a high frequency band (e.g., 30 GHz) while operating a PCell in a low frequency band (e.g., below 6 GHZ), BFR may not be supported in a high frequency band where BFR is actually needed. For this reason, standardization for BFR support on a SCell is performed in a Rel-16 NR MIMO work item. So far, as a result of a standardization discussion, UL transmission to a corresponding SCell is impossible at least for a DL only SCell, so it is planned to configure (dedicated) PUCCH resource(s), which are used for informing a base station that SCell beam failure occurred, in a SpCell and use it to perform a BFRQ for a SCell. Hereinafter, for convenience, the PUCCH is referred to as a BFR-PUCCH.

As described above, an object of a BFR-PRACH standardized in Rel-15 is to transmit 'occurrence of beam failure+new beam RS (set) information' together to a base station. Meanwhile, an object of a BFR-PUCCH is to inform only 'occurrence of beam failure to SCell(s)'. And, to which SCell(s) beam failure occurred (e.g., CC index(es)), whether there is a new beam for corresponding SCell(s) and a corresponding beam RS ID when there is a new beam (and quality(s) (e.g., a RSRP or a SINR) of corresponding beam RS(s)) may be reported as a subsequent MAC-CE (or UCI). Here, a subsequent beam report is not necessarily triggered all the time and it is possible to deactivate SCell(s) which are BFR configured for a corresponding terminal after a base station receives a BFR-PUCCH. A reason for such a design is because dozens of SCells may be associated with one PCell/PSCell and because from a viewpoint of a base station, there may be a lot of terminals sharing one PCell/PSCell UL, and considering even such a case, it is desirable to minimize the amount of UL resources reserved for a SCell BFRQ to each terminal in a PCell/PSCell.

CORESET (Control Resource Set) Control Resource Set)

A CORESET Information Element (IE) is used to configure a time/frequency CORESET for searching for downlink control information.

Table 6 illustrates a CORESET IE.

TABLE 6

```
-- ASN1START
-- TAG-CONTROLRESOURCESET-START
ControlResourceSet ::=                  SEQUENCE {
    controlResourceSetId                    ControlResourceSetId,
    frequencyDomainResources                BIT STRING (SIZE (45)),
    duration                                INTEGER (1..maxCoReSetDuration),
    cce-REG-MappingType                     CHOICE {
        interleaved                             SEQUENCE {
            reg-BundleSize                          ENUMERATED {n2, n3, n6},
            interleaverSize                         ENUMERATED {n2, n3, n6},
            shiftIndex
INTEGER(0..maxNrofPhysicalResourceBlocks-1)         OPTIONAL -- Need S
        },
        nonInterleaved                          NULL
    },
    precoderGranularity                     ENUMERATED {sameAsREG-bundle,
allContiguousRBs},
    tci-StatesPDCCH-ToAddList               SEQUENCE(SIZE (1..maxNrofTCI-
StatesPDCCH)) OF TCI-StateId OPTIONAL,   -- Cond NotSIB1-initialBWP
    tci-StatesPDCCH-ToReleaseList           SEQUENCE(SIZE (1..maxNrofTCI-
StatesPDCCH)) OF TCI-StateId OPTIONAL,   -- Cond NotSIB1-initialBWP
    tci-PresentInDCI                        ENUMERATED {enabled}
OPTIONAL, -- Need S
    pdcch-DMRS-ScramblingID                 INTEGER (0..65535)
OPTIONAL, -- Need S
    ...
}
-- TAG-CONTROLRESOURCESET-STOP
-- ASN1STOP
```

The following table 7 is a table which describes a field in a CORESET IE.

TABLE 7

Description on a CORESET IE field cce-REG-MappingType
Mapping of CCEs (control channel element) with REGs (resource element group)
controlResourceSetId
A value of 0 identifies a common CORESET (CORESET0, controlResourceSetZero) configured in a serving cell common configuration (ServingCellConfigCommon) or in a MIB (master information block) and is not used in this CORESET IE. A value of 1 to maxNrofControlResourceSets-1 identifies CORESETs configured by dedicated signaling or SIB1 (system information block 1). controlResourceSetId is unique among BWPs of a serving cell.
duration
Consecutive time duration of a CORESET in number of symbols (duration)
frequency DomainResources
Frequency domain resources for a CORESET. Each bit corresponds to a group of 6 RBs grouped starting from a first RB group in a BWP. A first (leftmost/most significant) bit corresponds to a first RB group in a BWP, and so on. A bit set as 1 indicates that this RB group belongs to a frequency domain resource of this CORESET. A bit corresponding to a group of RBs which are not entirely included in a BWP where a CORESET is configured is set as 0.
interleaverSize
Interleaver-Size
pdcch-DMRS-ScramblingID
Initialize PDCCH DMRS Scrambling. When this field is absent, UE applies a value of a physical cell identifier (physCellId) configured for this serving cell.
precoderGranularity
Precoder granularity in a frequency domain
reg-BundleSize
Resource element groups (REG) may be bundled to generate REG bundles. This parameter defines a size of such bundles.
shiftIndex
When this field is absent, UE applies a value of a physical cell identifier (physCellId) configured for this serving cell.
tci-PresentInDCI
This field indicates whether there is a TCI (transmission TABLE 7-continued Description on a CORESET IE field configuration indicator) field in DL-related DCI. When this field is absent, UE considers TCI to be absent/disabled. For cross carrier scheduling, a network sets this field to be used for a CORESET used for cross carrier scheduling in a scheduling cell.
tci-StatesPDCCH-ToAddList
A subset of TCI states defined in a PDSCH configuration (pdsch-Config) included in a DL BWP to which a CORESET belongs and a downlink dedicated BWP (BWP-DownlinkDedicated) corresponding to a serving cell. It is used to provide a QCL relation between PDCCH DMRS ports and DL RS(s) in one RS set (TCI state). A network configures an entry of the maximum number of PDCCH TCI states (maxNrofTCI-StatesPDCCH).
NotSIB1-initialBWP
This field is a field subject to conditional presence. When SIB1 is broadcast, this field is absent in a PDCCH common configuration (PDCCH-ConfigCommon) of a first BWP in SIB1 and a serving cell common configuration (ServingCellConfigCommon). Otherwise, it is optionally present.

A CORESET identifier (ControlResourceSetId) IE is related to a short identifier (short identity) used to identify a CORESET in a serving cell. ControlResourceSetId=0 identifies ControlResourceSet#0 configured through a PBCH (MIB) and controlResourceSetZero (serving cell common configuration (ServingCellConfigCommon)). An ID space is used in BWPs of a serving cell. The number of CORESETs per BWP is limited to 3 (including a common CORESET and a UE-specific CORESET).

Table 8 illustrates a ControlResourceSetId IE.

TABLE 8

```
-- ASN1START
-- TAG-CONTROLRESOURCESETID-START
ControlResourceSetId ::= INTEGER (0..maxNrofControlResourceSets-
1)
```

TABLE 8-continued

```
-- TAG-CONTROLRESOURCESETID-STOP
-- ASN1STOP
```

A CORESET zero (ControlResourceSetZero) IE is used to configure CORESET#0 of a first BWP. Table 9 illustrates a ControlResourceSetZero IE.

TABLE 9

```
-- ASN1START
-- TAG-CONTROLRESOURCESETZERO-START
ControlResourceSetZero ::=        INTEGER (0..15)
-- TAG-CONTROLRESOURCESETZERO-STOP
-- ASN1STOP
```

Operation Related to Multi-TRPs

A coordinated multi point (COMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a COMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

In addition, MTRP-URLLC may mean that a M TRPs transmit the same transport block (TB) by using different layer/time/frequency. A UE configured with a MTRP-URLLC transmission scheme receives an indication on multiple TCI state(s) through DCI and may assume that data received by using a QCL RS of each TCI state are the same TB. On the other hand, MTRP-eMBB may mean that M TRPs transmit different TBs by using different layer/time/frequency. A UE configured with a MTRP-eMBB transmission scheme receives an indication on multiple TCI state(s) through DCI and may assume that data received by using a QCL RS of each TCI state are different TBs. In this regard, as UE separately classifies and uses a RNTI configured for MTRP-URLLC and a RNTI configured for MTRP-eMBB, it may decide/determine whether the corresponding M-TRP transmission is URLLC transmission or eMBB transmission. In other words, when CRC masking of DCI received by UE is performed by using a RNTI configured for MTRP-URLLC, it may correspond to URLLC transmission, and when CRC masking of DCI is performed by using a RNTI configured for MTRP-eMBB, it may correspond to eMBB transmission.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

For example, a higher layer parameter, ControlResourceSet information element (IE), is used to configure a time/frequency control resource set (CORESET). In an example, the control resource set (CORESET) may be related to detection and reception of downlink control information. The ControlResourceSet IE may include a CORESET-related ID (e.g., controlResourceSetID)/an index of a CORE- SET pool for a CORESET (e.g., CORESETPoolIndex)/a time/frequency resource configuration of a CORESET/TCI information related to a CORESET, etc. In an example, an index of a CORESET pool (e.g., CORESETPoolIndex) may be configured as 0 or 1. In the description, a CORESET group may correspond to a CORESET pool and a CORESET group ID may correspond to a CORESET pool index (e.g., CORESETPoolIndex).

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 8:
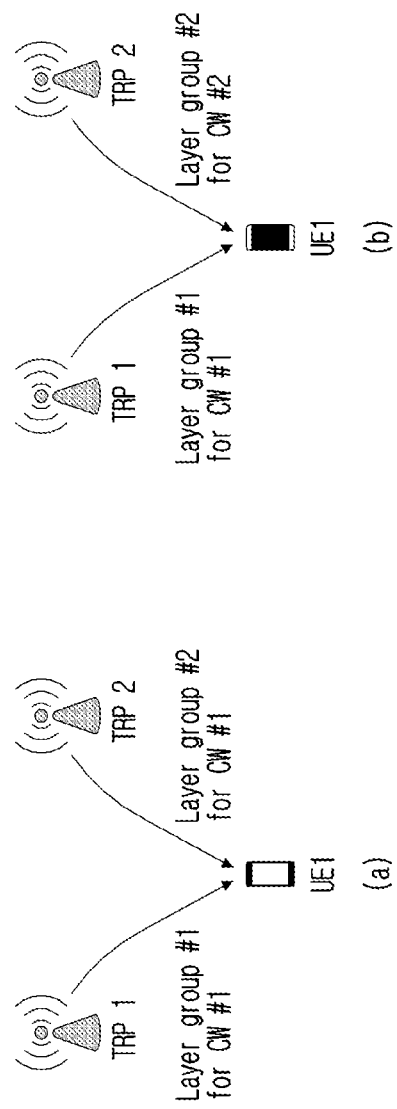
FIG. 8 illustrates a method of multiple TRPs transmission in a wireless communication system to which the present disclosure may be applied.

FIG. 8 illustrates a method of multiple TRPs transmission in a wireless communication system to which the present disclosure may be applied.

In reference to FIG. 8(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 8(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 8(b), it may have a disadvantage that a code rate corresponding to a TB is higher compared to FIG. 8(a). However, it has an advantage that it may adjust a code rate by indicating a different RV (redundancy version) value or may adjust a modulation order of each CW for encoded bits generated from the same TB according to a channel environment.

According to methods illustrated in FIG. 8(a) and FIG. 8(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Beam Failure Recovery (BFR) Method

The contents examined above (3GPP system, frame structure, NR system, beam failure recovery procedure (Rel-15/16), etc.) can be applied in combination with the methods proposed in the present disclosure, which will be described later, or it can be supplemented to clarify the technical features of the methods proposed in the present disclosure. The methods described below are divided for convenience of explanation, and some components of one method may be replaced with some components of another method or may be applied in combination with each other.

If a BFR operation defined in NR Rel-15/16 is applied to a multi-TRP transmission environment, when all CORESETs in which PDCCHs are transmitted in a specific TRP are in a beam failure situation and when there is a CORESET other than beam failure among the CORESETs in which PDCCHs are transmitted in the other TRP, a UE does not determine that it is a beam failure (BF) situation. To solve this problem, a TRP-specific BFR method is being discussed in standardization. In BFR considering M-TRP, it is necessary to consider both a case where BF occurs only for a specific TRP in a CC/BWP and a case where BF occurs in a corresponding CC/BWP itself (i.e., a case where BF occurs for all TRPs). In the present disclosure, particularly, a method and a UE operation for supporting TRP-specific BFR by configuring a separate BFRQ resource (PUCCH) for each TRP are proposed.

In the present disclosure, '/' means 'and', 'or', or 'and/or' depending on the context.

Among methods in which multiple TRPs/panels perform cooperative transmission to a single UE, there are two major approaches to support a method also called independent layer joint transmission (ILJT) or non-coherent joint transmission (NCJT).

One is a method in which each of a plurality of TRPs/panels transmit a PDCCH to cooperatively transmit data to a UE (multi-PDCCH based approach). The other is a method in which only one TRP/panel transmits a PDCCH, but multiple TRPs/panels/beams participate in PDSCH transmission to cooperatively transmit data (single PDCCH based approach).

When applying the multi-PDCCH based approach, each TRP/panel independently transmits DCI to a corresponding UE, so that an independent PDSCH can be scheduled.

If overlap occurs in a time/frequency domain between the corresponding PDSCHs, ILJT transmission may be supported in an overlapped region in the following form.

On a UE side, ILJT transmission may be supported in a form that some layer groups are transmitted through a specific TRP/panel, and other layer groups are transmitted through the other TRP/panel.

In other words, different TRPs/panels transmit PDCCHs in the same CC/BWP, and PDSCHs scheduled through the corresponding PDCCHs may overlap in a time/frequency domain.

In order for this operation to be supported even in a non-ideal backhaul environment where close cooperation between TRPs/panels is difficult to achieve, time/frequency resource areas in which each TRP/panel can transmit PDCCH should be separated. Therefore, in the NR system, CORESET groups through which each TRP/panel transmits a PDCCH can be separated.

If a beamforming technique is applied to each PDCCH transmission, beams for different CORESETs within each CORESET group may be configured/indicated differently. The beam may mean at least one of a TCI state, a source/QCL RS (e.g., CSI-RS/SSB), a spatial Tx filter, or a spatial Tx parameter.

In the above case, an operation based on characteristics related to a CORESET group may be configured.

As a characteristic related to the CORESET group, a Type-D QCL RS (e.g., spatial relation related RS (e.g., CSI-RS/SSB)) indicated in a TCI state of a CORESET may be different, but it can be considered that CORESETs belonging to the same CORESET group are transmitted in the same TRP/panel. Based on this, operations related to HARQ, UCI reporting handling, PUCCH/PUSCH collision handling, PDSCH rate matching, power control, etc. can be configured to be managed/performed per CORESET group.

If the existing beam failure recovery operation (BFR operation defined in NR Rel-15) is applied to the above-described multi-PDCCH based NCJT environment, the following problems may occur.

If all CORESETs belonging to a specific TRP are in a beam failure situation, but there is a CORESET that is not a beam failure among CORESETs belonging to the other TRP, a UE does not determine that it is a beam failure (BF) situation. Here, the all beam failed TRP may be a TRP (e.g., Primary TRP) responsible for transmitting important control information (e.g., SIB, RA, Paging). Even if (a specific beam of) the other TRP (e.g., Secondary TRP) is in a non-BF situation, a problem occurs in which a corresponding UE cannot receive important control information.

To solve this problem, discussions were underway to introduce a standard for TRP-specific BFR (see Table 10 below for Rel-17 standardization discussion).

Table 10 below shows agreements related to TRP-specific beam failure recovery (TRP-specific BFR). The embodiment (Proposal 1) of the present disclosure described later can be applied to UE/base station operation (e.g., configuration information related to beam failure recovery, BFRQ transmission, BFR MAC-CE transmission, etc.) in combination with all or part of the agreements according to Table 10 below.

TABLE 10

@RAN1 #102e
Agreement

Evaluate enhancement to enable per-TRP based beam failure recovery starting with Rel-15/16 BFR as the baseline.
Consider following potential enhancement aspects to enable per-TRP based beam failure recovery
Issue 1: TRP-specific BFD
Issue 2: TRP-specific new candidate beam identification
Issue 3: TRP-specific BFRQ
Issue 4: gNB response enhancement
Issue 5: UE behavior on QCL/spatial relation assumption/UL power control for DL and UL channels/RSs after receiving gNB response @RAN1 #103e
Agreement For M-TRP beam failure detection, support independent BFD-RS configuration per-TRP, where each TRP is associated with a BFD-RS set.
FFS: The number of BFD RSs per BFD-RS set, the number of BFD-RS sets, and number of BFD RSs across all BFD-RS sets per DL BWP
Support at least one of explicit and implicit BFD-RS configuration
With explicit BFD-RS configuration, each BFD-RS set is explicitly configured
FFS: Further study QCL relationship between BFD-RS and CORESET
FFS: How to determine implicit BFD-RS configuration, if supported
For M-TRP new beam identification
Support independent configuration of new beam identification RS (NBI-RS) set per TRP if NBI-RS set per TRP is configured
FFS: detail on association of BFD-RS and NBI-RS
Support the same new beam identification and configuration criteria as Rel. 16, including L1-RSRP, threshold Agreement Support TRP-specific BFD counter and timer in the MAC procedure
The term TRP is used only for the purposes of discussions in RAN1 and whether/how to capture this is FFS Agreement Support a BFRQ framework based on Rel. 16 SCell BFR BFRQ
In RAN1#104-e, select one from the following options
Option 1: Up to one dedicated PUCCH-SR resource in a cell group
A cell group refers to either MCG, SCG, or PUCCH cell group
FFS: number of spatial filters associated with the PUCCH-SR resources
FFS: How the SR configuration is done
Option 2: Up to two (or more) dedicated PUCCH-SR resources in a cell group
A cell group refers to either MCG, SCG, or PUCCH cell group
FFS: whether each PUCCH-SR resource is restricted to be associated to one spatial filter
FFS: How the SR configuration is done
FFS: Whether no dedicated PUCCH-SR resource can be supported in addition to Option 1 or Option 2
Study whether and how to provide the following information in BFRQ MAC-CE Index information of failed TRP(s)
CC index (if applicable)
New candidate beam index (if found)
Indication whether new beam(s) is found
FFS: whether/how to incorporate multi-TRP failure In summary, it was agreed to support TRP-specific BFR by enhancing Rel-16 PUCCH-based BFR. Based on this, the following operations can be defined/configured.

A beam failure detection RS set (BFD-RS set) for beam failure monitoring/detection may be configured to be TRP specific. That is, a specific BFD-RS set may explicitly/implicitly indicate a specific TRP. Hereinafter, in this specification, a TRP may be interpreted to mean a BFD-RS set, and conversely, a BFD-RS set may be interpreted to mean a TRP. As an example, a PUCCH resource related to a specific TRP may be interpreted as a PUCCH resource related to a specific BFD-RS set.

An NBI-RS set that configures candidate beams for a new beam identification may be configured TRP-specific. As an example, an NBI-RS set corresponding to a BFD-RS set may be configured. As an example, an NBI-RS set associated with each BFD-RS set may be configured.

In addition, when a TRP-specific BFR is declared, a PUCCH resource through which a UE informs a base station of BFR may be based on a single PUCCH resource (e.g., up to single PUCCH resource within a cell group) or a plurality of PUCCH resources (e.g., up to two PUCCH resources within a cell group).

Both methods have their pros and cons. The up to single PUCCH resource method has an advantage of saving SR PUCCH resources. On the other hand, the up to two PUCCH resource method has an advantage of informing a base station which TRP is in a beam failure (BF) situation through PUCCH transmission. Specifically, an SR PUCCH (resource) corresponding to each TRP is configured, and a TRP in a beam failure (BF) situation can be determined based on a PUCCH (resource) used in a BFR declaration (BFRQ transmission).

However, currently M-TRP transmission can be performed in both PCell (or SpCell) and SCell. Accordingly, the following situations can be assumed with respect to BF that occurs for each TRP.

First Cell (e.g., Cell #1): TRP 1 (BF O), TRP 2 (BF X)
Second Cell (e.g., Cell #2): TRP 1 (BF X), TRP 2 (BF O)
Third cell (e.g., Cell #3): TRP 1 (BF O), TRP 2 (BF O)

As described above, if a TRP (e.g., BFD-RS set) where BF occurs for each cell is different, the following problems may occur.

In terms of a UE operation, ambiguity may arise as to which of the two PUCCH resources should be used for BFR (BFRQ transmission).

In the present disclosure, a method and a UE operation for supporting TRP-specific BFR to solve the above problem are proposed. In the present disclosure, "occurrence of beam failure (BF)" may mean that BF is detected based on measurement of a BFD-RS set configured for detecting beam failure.

[Proposal 1]

Hereinafter, when X (SR) PUCCH resources are configured in a cell group for a Beam Failure Recovery reQuest (BFRQ), a method for transmitting a TRP specific BFRQ (TRP specific BFRQ) is described.

A UE may transmit a BFR PUCCH according to a number of dedicated (SR) PUCCH resources for BFRQ purposes configured in an SpCell within a cell group. Specifically, a UE may transmit a BFR PUCCH based on at least one of Embodiments i) to ii) below. The SpCell may refer to a special cell defined for a cell group. The SpCell may include a Primary Cell (PCell) for a Master Cell Group (MCG) and/or a Primary Secondary Cell (PSCell) for a Secondary Cell Group (SCG).

Embodiment i

It can be assumed that there is one dedicated (SR) PUCCH resource for (TRP-specific) BFRQ use configured in an SpCell within a specific cell group. A UE/base station may operate based on at least one of the following i-1) or i-2).

i-1)

It can be assumed that S-TRP transmission is performed in the SpCell (for a specific BWP). For example, only one control resource set pool (CORESET pool) or only one beam failure detection RS set/group (BFD RS set/group) may be configured in a corresponding SpCell. Here, a UE/base station may operate based on at least one of the following a) or b).

a) Beam Failure (BF) may occur in the SpCell. Specifically, it may be determined that all BFD RSs in a specific BWP within the SpCell are failures. In this case, a UE can request BFR (i.e., transmit a BFRQ) to a base station through the Rel-15-based PRACH-based BFR procedure. Afterwards, subsequent operations between a base station and a UE (gNB response and UE behavior regarding DL/UL beam update) may be performed.

Unlike Rel-15 BFR operation, a BFR MAC-CE may be transmitted to a base station (via Msg3/5). The corresponding BFR MAC-CE message may include information on a failed TRP (i.e., TRP in which BF was detected) for each cell. A BFD-RS set can be configured specifically for a TRP, and information on the TRP where the BF was detected can be interpreted as information on a BFD-RS set where the BF was detected.

b) BF does not occur in the SpCell, and (TRP-specific) BF may occur in SCell(s) within a cell group other than the SpCell. In this case, a UE may request BFR (i.e., transmit a BFRQ) to a base station using one dedicated (SR) PUCCH resource preconfigured for BFRQ purposes. Afterwards, subsequent operations between a base station and a UE (based on the PUCCH-based BFR procedure) may be performed. Specifically, the following operations 1) to 3) may be performed.

1) PUSCH scheduling based on gNB response (e.g., DCI)
2) BFRQ MAC CE transmission on a PUSCH (indicating that a specific TRP (specific BFD-RS set) (or specific CORESET pool index/specific CORESET group) in the SCell is in a BF situation)
3) DL/UL beam update When a UE transmits a BFRQ MAC CE, the message may include information on a failed TRP (i.e., a TRP in which BF was detected) for each cell.

A combination of the a) operation and the b) operation may be applied to a UE/base station operation.

i-2)

It can be assumed that M-TRP transmission is performed (for a specific BWP) in the SpCell. As an example, multiple CORESET pools or multiple beam failure detection RS sets/groups (BFD RS set/groups) may be configured in a corresponding SpCell. Here, a UE/base station may operate based on at least one of the following a) or b).

a) BF may occur only in some TRPs in the SpCell. Specifically, in a specific BWP within the SpCell, all BFD RSs within a specific BFD-RS set may be determined to be failures. In this case, a UE may request BFR (i.e., transmit a BFRQ) to a base station using one dedicated (SR) PUCCH resource preconfigured for BFRQ purposes. Afterwards, subsequent operations between a base station and a UE (based on the PUCCH-based BFR procedure) (see 1) to 3) of i-1) b) above) may be performed. When transmitting a UE's BFR MAC CE, a corresponding message may include information on a failed TRP (i.e., a TRP in which a BF was detected) for each cell.

On the other hand, BF may occur for all TRPs in the SpCell. Specifically, it may be determined that all BFD RSs for all BFD RS sets in a specific BWP within the SpCell are failures. In this case, a UE can request BFR (i.e., transmit a BFRQ) to a base station through the Rel-15-based PRACH-based BFR procedure. Afterwards, subsequent operations between a base station and a UE (gNB response and UE behavior regarding DL/UL beam update) may be performed.

Unlike the Rel-15 BFR operation, a BFR MAC-CE may be transmitted to a base station (via Msg3/5). The corresponding BFR MAC-CE message may include information on a failed TRP (i.e., TRP in which BF was detected) for each cell.
- b) BF does not occur in all TRPs of the SpCell, and BF may occur in a specific TRP (e.g., TRP-specific BF) and/or in all TRPs (e.g., cell-specific BF) in SCell(s) within a cell group other than the SpCell. In the above case, TRP-specific beam failure recovery (TRP-specific BFR) and/or tpf specific beam failure recovery (cell-specific BFR) operations may be performed.

Specifically, a UE may request BFR (i.e., transmit a BFRQ) to a base station using one dedicated (SR) PUCCH resource preconfigured for BFRQ purposes. Afterwards, subsequent operations between a base station and a UE (based on the PUCCH-based BFR procedure) (see 1) to 3) of i-1) b) above) may be performed.

From an implementation perspective, a combination of the operation a and the operation b may be applied to a UE/base station operation.

Embodiment ii

It may be assumed that there are two or more dedicated (SR) PUCCH resources for (TRP-specific) BFRQ use in an SpCell within a specific cell group.

Among the plurality of dedicated (SR) PUCCH resources configured for the BFRQ purpose, a specific PUCCH resource may be connected/mapped/associated with at least one of the following 1), 2) or 3) (for each CC/BWP).
1) Specific TRP (e.g., specific beam failure detection RS set (specific BFD-RS set))
2) Specific control resource set pool index (specific CORESETPoolIndex)
3) Subset of all control resource sets within a bandwidth part (BWP) (and/or CORESET group index)

A UE/base station may operate based on at least one of the following ii-1) or ii-2).
ii-1)
It may be assumed that S-TRP transmission is performed (for a specific BWP) in the SpCell. For example, only one control resource set pool (CORESET pool) or only one beam failure detection RS set/group (BFD RS set/group) may be configured in the corresponding SpCell. Here, a UE/base station may operate based on at least one of the following a) or b).
- a) BF (Beam Failure) may occur in the SpCell. Specifically, it may be determined that all BFD RSs in a specific BWP within the SpCell are failures. In this case, a UE can request BFR (i.e., transmit a BFRQ) to a base station through the Rel-15-based PRACH-based BFR procedure. Afterwards, subsequent operations between a base station and a UE (gNB response and UE behavior regarding DL/UL beam update) may be performed.

Unlike Rel-15 BFR operation, a BFR MAC-CE may be transmitted to a base station (via Msg3/5). A corresponding BFR MAC-CE message may include information on a failed TRP (i.e., TRP in which BF was detected) for each cell.
- b) BF does not occur in the SpCell, and TRP-specific BF and/or all TRP BF (or cell-specific BF) may occur in SCells within a cell group other than the SpCell. A UE may operate based on at least one of Example 1) or Example 2) below to determine a PUCCH resource for requesting BFR (i.e., PUCCH resource for BFRQ transmission).

Example 1) It can be assumed that BF occurs in a single SCell, and the BF occurs in a specific TRP within an SCell where a BFR procedure is triggered.

A UE may transmit a BFRQ to a base station through a PUCCH resource related to a corresponding TRP (or a TRP in which BF has not occurred) among two PUCCH resources (configured in SpCell).

As an example, a UE may request BFR (i.e., transmit a BFRQ) to a base station through a PUCCH resource of an SpCell associated with a specific CORESETPoolIndex (and/or CORESET group index). The specific CORESETPoolIndex (and/or CORESET group index) may be related to the specific TRP.

As an example, a UE may transmit BFRQ to a base station through a PUCCH resource associated with a BFD-RS configured in which beam failure was detected.

Afterwards, subsequent operations between a base station and a UE (based on the PUCCH-based BFR procedure) (see 1) to 3) of i-1) b) above) may be performed. When a UE transmit a BFR MAC CE, the message may not include information on a failed TRP (i.e., a TRP in which BF was detected) for each cell.

On the other hand, it can be assumed that BF occurs in a single SCell and that BF occurs in all TRPs within the SCell where a BFR procedure is triggered. In this case, a UE can request BFR (i.e., transmit BFRQ) to a base station by using one of two PUCCH resources (configured in an SpCell) or by using a PUCCH resource selected according to a specific rule.

As an example, the PUCCH resource selected according to the specific rule may be defined based on at least one of the following examples.
'PUCCH of lowest index'
PUCCH in which 'PUCCH-spatialRelationInfo of lowest index' is configured/activated
PUCCH in which 'TCI-state of lowest index' is configured/activated/indicate After a UE transmits a BFRQ, subsequent operations between a base station and a UE (based on the PUCCH-based BFR procedure) (see 1) to 3) of i-1) b) above) may be performed. When a UE transmits a BFR MAC CE, the message may include information on a failed TRP (i.e., a TRP in which BF was detected) for each cell. Or/and a PUCCH resource pre-defined by a base station configuration may exist in the corresponding message. For example, a base station may configure a primary PUCCH resource among a plurality of dedicated (SR) PUCCH resources.

Example 2) It can be assumed that BF occurs in a plurality of SCells, and the BF occurs in a specific TRP within the SCell(s) where a BFR procedure is triggered.

A UE may transmit a BFRQ to a base station through a PUCCH resource related to the TRP (or the TRP in which BF has not occurred) among two PUCCH resources (configured in SpCell).

As an example, a UE may request BFR (i.e., transmit a BFRQ) to a base station through a PUCCH resource of an SpCell associated with a specific CORESETPoolIndex (and/or CORESET group index). The specific CORESETPoolIndex (and/or CORESET group index) may be related to the specific TRP.

As an example, a UE may transmit a BFRQ to a base station through a PUCCH resource associated with a BFD-RS set in which beam failure was detected.

Afterwards, subsequent operations between a base station and a UE (based on the PUCCH-based BFR procedure) (see 1) to 3) of i-1) b) above) may be performed. When a UE transmits a BFR MAC CE, the message may not include information on a failed TRP (i.e., the TRP in which a BF was detected) for each cell.

On the other hand, it can be assumed that BF occurs in a plurality of SCells, and failed TRPs (i.e., TRP in which BF is detected) are different for each SCell in the SCell(s) in which a BFR procedure is triggered (example: both-TRP (TRP 1/2) fails in SCell #1, TRP 1 fails in SCell #2, and TRP 2 fails in SCell #3).

Among the corresponding SCell(s), a UE may request BFR (i.e., transmit a BFRQ) to a base station using a PUCCH resource related to a TRP determined based on the number of beam failure detections or a PUCCH resource selected according to a specific rule.

The TRP determined based on the number of beam failure detections may mean a TRP in which beam failure is detected a higher number of times (i.e., TRP with the highest number of beam failure detections) or a TRP in which beam failure is detected a smaller number of times (i.e., TRP with the smallest number of beam failure detections).

As an example, the PUCCH resource related to the TRP determined based on the number of beam failure detections may be a PUCCH resource of an SpCell associated with a specific CORESETPoolIndex (and/or CORESET group index). The specific CORESETPoolIndex (and/or CORESET group index) may be related to the determined TRP.

As an example, the PUCCH resource selected according to the specific rule may be defined based on at least one of the following examples.

'PUCCH of lowest index'
PUCCH in which 'PUCCH-spatialRelationInfo of lowest index' is configured/activated
PUCCH in which 'TCI-state of lowest index' is configured/activated/indicated After a UE transmits a BFRQ, subsequent operations between a base station and a UE (based on the PUCCH-based BFR procedure) (see 1) to 3) of i-1) b) above) may be performed. When a UE transmits a BFR MAC CE, the message may include information on a failed TRP (i.e., TRP in which BF was detected) for each cell. Or/and a pre-defined PUCCH resource may exist depending on a base station configuration. For example, a base station may configure a primary PUCCH resource among a plurality of dedicated (SR) PUCCH resources.

A combination of the a) operation and the b) operation may be applied to a UE/base station operation.

ii-2)

It can be assumed that M-TRP transmission is performed (for a specific BWP) in the SpCell. As an example, multiple CORESET pools or multiple beam failure detection RS sets/groups (BFD RS set/groups) may be configured in the corresponding SpCell. Here, a UE/base station may operate based on at least one of the following a), b), or c).

a) BF may occur for all TRPs in the SpCell. Specifically, it may be determined that all BFD RSs for all BFD RS sets in a specific BWP within the SpCell are failures. In this case, a UE can request BFR (i.e., transmit a BFRQ) to a base station through the Rel-15-based PRACH-based BFR procedure. Afterwards, subsequent operations between a base station and a UE (gNB response and UE behavior regarding DL/UL beam update) may be performed.

Unlike Rel-15 BFR operation, a BFR MAC-CE may be transmitted to a base station (via Msg3/5). The corresponding BFR MAC-CE message may include information on a failed TRP (i.e., TRP in which BF was detected) for each cell. As an example, the information on the failed TRP (i.e., TRP in which BF was detected) for each cell may mean information on a BFD-RS set in which BF was detected among a plurality of BFD-RS sets for each cell.

b) TRP-specific BF may occur in the SpCell, and additionally, TRP-specific BF and/or all TRP BF (or cell-specific BF) may occur in a SCell within a cell group other than the SpCell. A UE may operate as follows to determine a PUCCH resource for requesting BFR (i.e., PUCCH resource for BFRQ transmission).

Example 1) It can be assumed that BF occurs at a specific TRP in an SpCell where a BFR procedure is triggered. A UE can transmit a BFRQ to a base station through a PUCCH resource related to a TRP (or TRP in which BF has not occurred) among two PUCCH resources (configured in SpCell).

As an example, a UE may request BFR (i.e., transmit a BFRQ) to a base station through a PUCCH resource of an SpCell associated with a specific CORESETPoolIndex (and/or CORESET group index). The specific CORESETPoolIndex (and/or CORESET group index) may be related to the specific TRP.

As an example, a UE may transmit a BFRQ to a base station through a PUCCH resource associated with a BFD-RS set in which beam failure was detected.

Afterwards, subsequent operations between a base station and a UE (based on the PUCCH-based BFR procedure) (see 1) to 3) of i-1) b) above) may be performed. When a UE transmits a BFR MAC CE, the message may not include information on a failed TRP (i.e., TRP in which a BF was detected) for each cell.

c) BF does not occur in the SpCell, and TRP-specific BF and/or all TRP BF (or cell-specific BF) may occur in SCells within a cell group other than the SpCell. A UE may operate based on at least one of Example 1) or Example 2) below to determine a PUCCH resource for requesting BFR (i.e., PUCCH resource for BFRQ transmission).

Example 1) It can be assumed that BF occurs in a single SCell, and the BF occurs in a specific TRP within an SCell where a BFR procedure is triggered.

A UE may transmit a BFRQ to a base station through a PUCCH resource related to a TRP (or TRP in which BF has not occurred) among two PUCCH resources (configured in SpCell).

As an example, a UE may request BFR (i.e., transmit a BFRQ) to a base station through a PUCCH resource of an SpCell associated with a specific CORESETPoolIndex (and/or CORESET group index). The specific CORESETPoolIndex (and/or CORESET group index) may be related to the specific TRP.

As an example, a UE may transmit a BFRQ to a base station through a PUCCH resource associated with a BFD-RS set in which beam failure was detected.

Afterwards, subsequent operations between a base station and a UE (based on the PUCCH-based BFR procedure) (see 1) to 3) of i-1) b) above) may be performed. When a UE transmits a BFR MAC CE, the message may not include information on a failed TRP (i.e., TRP in which a BF was detected) for each cell.

On the other hand, it can be assumed that BF occurs in a single SCell and that BF occurs in all TRPs within the SCell where a BFR procedure is triggered. In this case, a UE can request BFR (i.e., transmit BFRQ) to a base station by using one of two PUCCH resources (configured in SpCell) or by using a PUCCH resource selected according to a specific rule.

As an example, the PUCCH resource selected according to the specific rule may be defined based on at least one of the following examples.

'PUCCH of lowest index'
PUCCH in which 'PUCCH-spatialRelationInfo of lowest index' is configured/activated
PUCCH in which 'TCI-state of lowest index' is configured/activated/indicated After a UE transmits a BFRQ, subsequent operations between a base station and a UE (based on the PUCCH-based BFR procedure) (see 1) to 3) of i-1) b) above) may be performed. When a UE transmits a BFR MAC CE, the message may include information on a failed TRP (i.e., TRP in which a BF was detected) for each cell. Or/and a PUCCH resource pre-defined by a base station configuration may exist in the corresponding message. For example, a base station may configure a primary PUCCH resource among a plurality of dedicated (SR) PUCCH resources.

Example 2) It can be assumed that BF occurs in a plurality of SCells, and the BF occurs in a specific TRP within SCell(s) where a BFR procedure is triggered.

A UE may transmit a BFRQ to a base station through a PUCCH resource related to a TRP (or TRP in which BF has not occurred) among two PUCCH resources (configured in SpCell).

As an example, a UE may request BFR (i.e., transmit a BFRQ) to a base station through a PUCCH resource of SpCell associated with a specific CORESETPoolIndex (and/or CORESET group index). The specific CORESETPoolIndex (and/or CORESET group index) may be related to the specific TRP.

As an example, a UE may transmit a BFRQ to a base station through a PUCCH resource associated with a BFD-RS set in which beam failure was detected.

Afterwards, subsequent operations between a base station and a UE (based on the PUCCH-based BFR procedure) (see 1) to 3) of i-1) b) above) may be performed. When a UE transmits a BFR MAC CE, the message may not include information on a failed TRP (i.e., the TRP in which a BF was detected) for each cell.

On the other hand, it can be assumed that BF occurs in a plurality of SCells, and failed TRPs (i.e., TRP in which BF is detected) are different for each SCell in the SCell(s) in which a BFR procedure is triggered (example: both-TRP (TRP 1/2) fails in SCell #1, TRP 1 fails in SCell #2, and TRP 2 fails in SCell #3).

Among corresponding SCell(s), a UE may request BFR (i.e. transmit a BFRQ) to a base station using a PUCCH resource related to a TRP determined based on the number of beam failure detections or a PUCCH resource selected according to a specific rule.

The TRP determined based on the number of beam failure detections may mean a TRP in which beam failure is detected a higher number of times (i.e., TRP with the highest number of beam failure detections) or a TRP in which beam failure is detected a smaller number of times (i.e., TRP with the smallest number of beam failure detections).

As an example, the PUCCH resource related to the TRP determined based on the number of beam failure detections may be a PUCCH resource of an SpCell associated with a specific CORESET PoolIndex (and/or CORESET group index). The specific CORESETPoolIndex (and/or CORESET group index) may be related to the determined TRP.

As an example, the PUCCH resource selected according to the specific rule may be defined based on at least one of the following examples.

'PUCCH of lowest index'
PUCCH in which 'PUCCH-spatialRelationInfo of lowest index' is configured/activated
PUCCH in which 'TCI-state of lowest index' is configured/activated/indicated After a UE transmits a BFRQ, subsequent operations between a base station and a UE (based on the PUCCH-based BFR procedure) (see 1) to 3) of i-1) b) above) may be performed. When a UE transmits a BFR MAC CE, the message may include information on a failed TRP (i.e., TRP in which BF was detected) for each cell. Or/and a pre-defined PUCCH resource may exist depending on a base station configuration. For example, a base station may configure a primary PUCCH resource among a plurality of dedicated (SR) PUCCH resources.

A combination based on two or more of the a) operation, the b) operation and the c) operation may be applied to a UE/base station operation.

In terms of implementation, operations of a base station/UE according to the above-described Embodiments (e.g., operations related to beam failure recovery based on at least one of proposal 1/i-1 of Embodiment i/i-2 of Embodiment i/ii-1 of Embodiment ii/ii-2 of Embodiment ii) may be processed by the device of FIG. 12 (e.g., processors 102 and 202 of FIG. 12), which will be described later.

Figure 12:
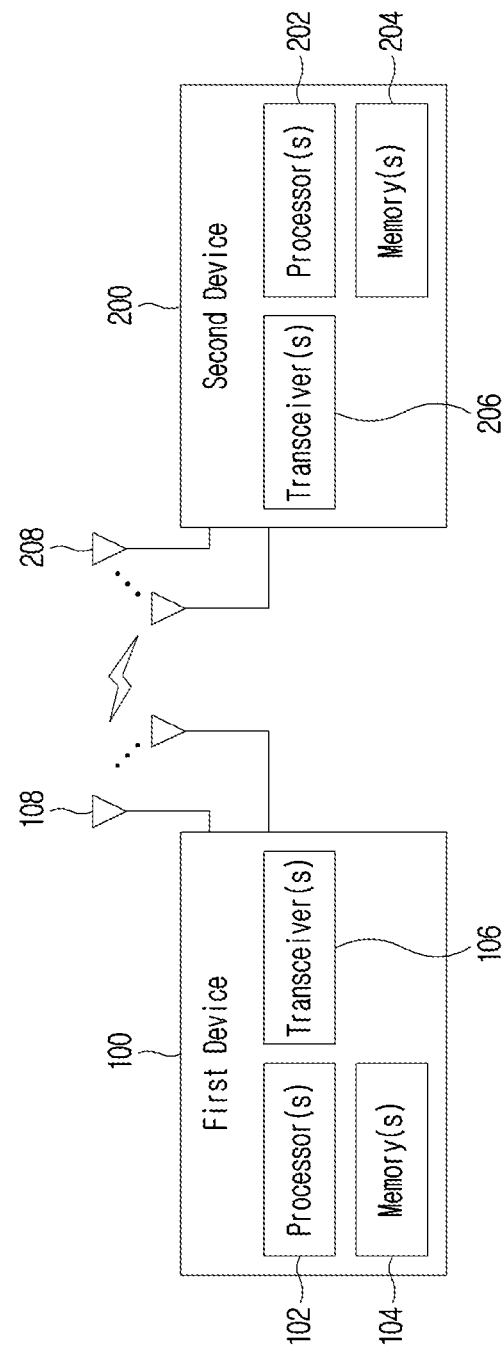
FIG. 12 illustrates a block diagram of a wireless communication device according to an embodiment of the present disclosure.

In addition, operations of a base station/UE according to the above-described Embodiment may be stored in a memory (e.g., 104, 204 in FIG. 12) in a form of instructions/programs (e.g., instruction, executable code) for driving at least one processor (e.g., 102, 202 in FIG. 12).

In addition to the discussion described above, discussions are currently underway in standardization as to whether Rel-15 (PRACH-based BFR for a special cell (SpCell) (This includes a primary cell (PCell) and a primary secondary cell (PSCell)))/Rel-16 BFR (PUCCH-based BFR for a secondary cell (SCell)) operation and Rel-17 M-TRP BFR operation can coexist. Rel-15 BFR covers only an SpCell in monitoring/detection of beam failure (BF), and Rel-16 BFR covers only a SCell, on the other hands, since M-TRP operation is possible in both an SpCell and an SCell, Rel-17 M-TRP BFR can be a BFR operation that basically covers both an SpCell and a SCell. In addition, even if an M-TRP operation is performed on a specific cell and an S-TRP operation is performed on another cell, it has an advantage of being able to perform both M-TRP BF and S-TRP BF through Rel-17 M-TRP BFR. However, if a beam environment is not good enough to cause Rel-15 BF in an SpCell, because Rel-17 BFR transmits a beam failure recovery request (BFRQ) to a base station based on a PUCCH, there may be deterioration in robustness compared to a PRACH. That is, in a PsCell, coexistence of Rel-15 PRACH based BFR and Rel-17 M-TRP BFR can be advantageous in terms of reliability between a base station and a UE. In this disclosure, a method for coexisting Rel-15/16 BFR (this is referred to as cell-specific BFR) and Rel-17 (M-TRP) BFR and a subsequent UE/base station operation are proposed.

In the present disclosure, '/' can be interpreted as 'and', 'or', or 'and/or' depending on the context.

Embodiment 1: In order for Rel-16 (cell-specific) BFR and Rel-17 (M-TRP) BFR to coexist, the following method is proposed.

According to this embodiment, a UE may not expect a base station to perform both Rel-16 (cell-specific) BFR configuration and Rel-17 (M-TRP) BFR configuration for a specific Scell or cell group. That is, a UE can expect a base station to perform only Rel-16 (cell-specific) BFR configuration or only Rel-17 (M-TRP) BFR configuration for a specific Scell or cell group.

If only Rel-16 (cell-specific) BFR configuration is performed for a UE for a specific Scell or cell group, only one dedicated PUCCH-SR resource (i.e., it can be configured by an applicable scheduling request configuration (resource) for BFR, e.g., schedulingRequestID-BFR-SCell) for a BFRQ can be configured per cell group. If only Rel-17 (M-TRP) BFR configuration is performed for a UE for a specific Scell or cell group, up to two dedicated PUCCH-SR resources for a BFRQ can be configured per cell group.

Through the above UE operation, it is possible to prevent PUCCH-SR resources for BFRQ transmission from increasing. In the case of Rel-16 BFR, one dedicated PUCCH-SR resource in a cell group is required for cell-specific BFR operation, but in Rel-17 BFR, up to two dedicated PUCCH-SR resources in a cell group are required for TRP-specific BFR operation. If Rel-16 BFR and Rel-17 BFR configurations are performed on a UE at the same time for a specific cell (or cell group), limited PUCCH-SR resources are further wasted, which also affects an operation of the existing scheduling request.

In addition, in an enhanced (Rel-17) UE, even if only the Rel-17 M-TRP BFR configuration corresponding to the enhanced BFR operation is performed, depending on whether an M-TRP operation or an S-TRP operation is performed on a specific cell, a TRP-specific BFR and a cell-specific (S-TRP) BFR can be performed for each cell (or cell group). That is, when performing BFR MAC-CE transmission (via the corresponding PUSCH) by PUSCH scheduling of the base station after transmission of the terminal's PUCCH, That is, when performing BFR MAC-CE transmission (via the corresponding PUSCH) by PUSCH scheduling of a base station after transmission of a UE's PUCCH, based on whether it is an M-TRP operation corresponding to each cell (or cell group) and/or beam failure status, as contents of the MAC-CE, cell-specific BF information (a cell fails)/TRP-specific BF information (a specific TRP or all TRPs fail within a cell) for each cell (or cell group) can be loaded and transmitted on the MAC-CE for each cell (or cell group).

Embodiment 2: In order for Rel-15/Rel-16 (cell-specific) BFR and Rel-17 (M-TRP) BFR to coexist, the following method is proposed.

A base station can configure both a cell-specific BFR configuration and a Rel-17 (M-TRP) BFR configuration for a specific cell (or cell group) to a UE.

According to the standards to date, when determining an implicit beam failure detection (BFD) reference signal (RS: reference signal), if the number of CORESETs with different TCIs (e.g., QCL RSs for different spatial RX parameters, i.e., QCL type-D RS is configured) in a CC/BWP exceeds 2, a UE randomly selects one CORESET and determines a BFD RS with a QCL type-D RS configured in the selected CORESET. Depending on how a UE determines a (implicit) BFD RS and a (implicit) BFD RS corresponding to an M-TRP BFR (or how a base station configures an explicit BFD RS), cell-specific BF occurs but M-TRP BF does not occur in some situations, or conversely, BF occurs in all TRPs among M-TRPs but no cell-specific BF occurs in some situations. In other words, depending on a situation, mismatch between cell-specific BF and M-TRP BF may occur.

For example, it is assumed that, in a specific component carrier (CC) (or cell)/BWP, CORESET 0 and 1 belong to CORESET pool (or CORESET group) 1, and CORESET 2 and 3 belong to CORESET pool (or CORESET group) 2. Here, each CORESET pool (or CORESET group) may correspond to each different TRP.

Issue 1: It is assumed that a UE determines a (implicit) BFD RS corresponding to a cell-specific BFR configuration to be a beam of CORESET 0 and 1 (QCL type-D RS) and beam failure of the configured COSESET 0 and 1 has been detected/determined. It may be sufficient for a UE to declare BF (i.e., perform PUCCH-based TRP-specific BFRQ) only for a TRP corresponding to CORESET pool (group) 1. However, a UE may have problems detecting/determining beam failure in the corresponding cell and performing cell-specific BFRQ (e.g., for Spcell, a PRACH-BFR (i.e., PRACH resource dedicated to BFR) trigger).

Solution 1 for Issue 1: When a cell-specific BFR and an M-TRP BFR are configured together in a specific cell (or CC)/BWP (and if explicit BFD RS is not configured in each BFR configuration), a UE can configure cell-specific BFD RSs as a super set (union) of BFD RSS performed for M-TRP BFR configurations. That is, for the cell (or CC)/BWP, a UE may determine a TRP-specific BFD RS with a QCL type-D RS of CORESET(s) belonging to a CORESET pool (or group) corresponding to each TRP, and may configured cell-specific BFD RSs as a union of the TRP-specific BFD RSs for each TRP.

If an explicit BFD RS is configured in a TRP-specific BFR-related configuration (and if there is no explicit BFD RS configuration in a cell-specific BFR-related configuration), a UE may configure cell-specific BFD RSs as a super set (union) of TRP-specific BFD RSs. In other words, a UE can configure cell-specific BFD RSs as a union of explicit TRP-specific BFD RSs configured for each TRP.

Alternatively, if an explicit BFD RS is configured in a TRP-specific BFR-related configuration (and if an explicit BFD RS is configured in a cell-specific BFR-related configuration), a UE expects a super set (union) of TRP-specific BFD RSs to match cell-specific BFD RSs (a UE does not expect any other configurations). In other words, a base station can configure a UE so that a super set (union) of TRP-specific BFD RSs matches cell-specific BFD RSs.

Through this, a UE can solve the problem regarding the issue 1 because a cell-specific BFRQ operation is triggered only in the case of beam failure for all TRPs.

For example, for a specific cell (or CC)/BWP, as in the example above, if CORESET 0 and 1 belong to CORESET pool (or CORESET group) 1, and CORESET 2 and 3 belong to CORESET pool (or CORESET group) 2, it is assumed that a UE selects a beam of CORESET 0 (i.e., QCL type-D RS) as a BFD RS of pool (group) 1 and a beam of CORESET 2 (i.e., QCL type-D RS) as a BFD RS of pool (group) 2. In this case, a UE can select both a beam of CORESET 0 and a beam of CORESET 2 as cell-specific BFD RS. (Or/and a base station may perform (explicit) BFD RS configuration for a beam of CORESET 0 and a beam of CORESET 2).

Issue 2: Regarding a specific cell (or CC)/BWP, in the above example, it is assumed that a UE has determined that a (implicit) BFD RS corresponding to a cell-specific BFR configuration is a beam of CORESET 0 and 1 and CORESET 2 (QCL type-D RS). In addition, it is assumed that a UE has determined a beam of CORESET 0 (i.e., QCL type-D RS) in CORESET pool (group) 1 and a beam of CORESET 2 (i.e., QCL type-D RS) in CORESET pool (group) 2 for the TRP-specific BFD RS. In this case, when detecting/determining beam failure of CORESET 0 and 2, a problem may occur in which a UE does not perform a cell-specific BFRQ (e.g., for Spcell, a PRACH-BFR (i.e., PRACH resource dedicated to BFR) trigger) even though beams of all TRPs for a cell (or CC)/BWP (e.g., SpCell) are broken.

Solution 2 for Issue 2: When a cell-specific BFR and an M-TRP BFR are configured together in a specific cell (or CC)/BWP (and if an explicit BFD RS is not configured in each BFR configuration), a UE may configure cell-specific BFD RSs as a sub-set (i.e., including a union) of a super set (union) of BFD RSs performed for M-TRP BFR configurations. Here, a UE can configure to include at least one BFD RS for each TRP (each CORESET pool or/and group) in cell-specific BFD RSs. That is, for a cell (or CC)/BWP, a UE may determine a TRP-specific BFD RS with a QCL type-D RS of CORESET(s) belonging to a CORESET pool (or group) corresponding to each TRP and may configure cell-specific BFD RSs as a subset of a union of TRP-specific BFD RSs that includes at least one TRP-specific BFD RS for each TRP.

If an explicit BFD RS is configured in a TRP-specific BFR-related configuration (and if there is no explicit BFD RS configuration in a cell-specific BFR-related configuration), a UE can configure cell-specific BFD RSs as a sub-set (i.e., including a union) of a super set (union) of TRP-specific BFD RSs. In other words, a UE can configure cell-specific BFD RSs as a subset of a union of explicit TRP-specific BFD RSs configured for each TRP. Even in this case, the cell-specific BFD-RSs may include at least one TRP-specific BFD RS for each TRP.

Alternatively, if an explicit BFD RS is configured in a TRP-specific BFR-related configuration (and if an explicit BFD RS is configured in a cell-specific BFR-related configuration), a UE expects cell-specific BFD RSs to match a subset (i.e., including the union) of a super set (union) of TRP-specific BFD RSs (a UE does not expect any other configurations). In other words, a base station can configure cell-specific BFD RSs to match a subset (i.e., including the union) of a super set (union) of the TRP-specific BFD RSs.

Through this, in the case of beam failure for all TRPs, a UE always triggers a cell-specific BFRQ operation (e.g., PRACH-BFR in the case of Spcell (i.e., PRACH resource dedicated to BFR)), therefore the problem with issue 2 can be resolved.

Issue 3: When both a cell-specific BFR and an M-TRP BFR are configured in an SpCell, when a UE detects/determines beam failure of all TRPs in the cell, a problem may arise in that it may be ambiguous whether a UE performs a PRACH-based BFRQ operation or a PUCCH-based BFRQ operation.

Solution 3 for issue 3: When configuring PRACH based BFD RSs as a super set (union) of BFD RSs performed for M-TRP BFR configurations as in solution 1 above, if a beam failure occurs in all TRPs (beam failure occurs in all M-TRP BFD RSs configured in SpCell), a UE can perform a PRACH-based BFRQ operation rather than a PUCCH-based BFRQ operation.

On the other hand, as in solution 2 above, when PRACH-based BFD RSs is configured as a sub-set (i.e., also includes a union) of a super set (union) of BFD RSs performed for M-TRP BFR configurations and is configured to include at least one BFD RS of TRP (each CORESET pool or/and group), even without separate configurations, a UE can perform a PRACH-based BFRQ operation (because a PRACH-based BFD RS corresponds to a sub-set of M-TRP BFD RS) before beam failure for all TRPs is detected/determined (before beam failure occurs in all M-TRP BFD RSs configured in an SpCell).

Alternatively, in Embodiment 2, a UE may not expect a base station to perform both Rel-15 (cell-specific) BFR configuration and Rel-17 (M-TRP) BFR configuration. In other words, a UE can perform operations according to either the Rel-15 (cell-specific) BFR configuration or the Rel-17 (M-TRP) BFR configuration configured by a base station.

Issue 4: When a cell-specific BFR and Rel-17 (M-TRP) BFR are configured together in a specific CC/BWP of a UE, and when a cell-specific BFR-related beam failure instance (BFI) counter and a TRP-specific BFI counter operate simultaneously, the following problems may occur.

For example, it is assumed that BFD RS #1 for TRP #1 and BFD RS #2 for TRP #2 are configured, and BFD RS #1 and #2 are configured for a cell-specific BFR. In addition, it is assumed that F=fail, S=success, and the maximum value for a BFI count is 3.

Reception time of BFI=1, 2, 3, 4

RS #1=F, S, F, F (BFI count=max)

RS #2=S, F, F, F (BFI count=max)

In the above case, for the TRP-specific BFD, a UE may determine a failure for all TRPs because BFI counts of RS #1 and RS #2 reaches respectively the max value at BFI reception time 4. On the other hand, from the cell's perspective, since it is S, S, F, and F for time 1, 2, 3, and 4 (if it is F for all BFD RS #1, #2, it will be determined as final F), a UE determines that a beam failure has not occurred in the cell-specific BFD.

Solution 4 for Issue 4: To configure an integrated BFR, a method of integrating BFI counts for a cell-specific BFR and a TRP-specific BFR is proposed as follows.

A UE can perform a BFI count for each TRP (using only a BFI count for a TRP-specific BFR). If any BFI count reaches the maximum value for each TRP-specific BFD RS (set), a BFRQ operation using a PUCCH-SR resource (i.e. (i.e., applicable scheduling request configuration (resource) for BFR)) may be triggered.

On the other hand, if beam failure is determined for all TRPs for each TRP-specific BFD RS (i.e., all BFI counts for each TPR reach max), a UE can perform a BFRQ operation using a PRACH resource. That is, if beam failure is determined for a TRP of some of multiple TRPs (e.g., one of two TRPs), a PUCCH-BFR operation of a UE is triggered, and if beam failure is determined for all of multiple TRPs (e.g., both TRPs), a PRACH-BFR operation of a UE may be triggered.

In an integrated BFR configuration, to enable the proposed UE operation, a base station can configure for a UE both a PRACH resource to be used in case of beam failure for all of multiple TRPs (e.g., both TRPs) and a PUCCH-SR resource to be used in the case of some of multiple TRPs (e.g., either one of the two TRPs). Alternatively, in this case, a base station can configure a UE to perform a BFR operation using only a PRACH resource (to prepare for the worst case).

After transmitting a PUCCH or PRACH for the BFR, a UE may transmit a BFR MAC-CE to a base station (if a UE is assigned an available UL-SCH or if there is a UL-SCH). Through the corresponding MAC-CE, it may be possible to report whether it is a beam failure of some (or a single) TRP or a beam failure (or cell-specific BF) of all TRPs. Here, if there is a UL-SCH already allocated to a UE, the BFR MAC-CE may be transmitted to a base station through the UL-SCH (omitting the PUCCH/PRACH transmission step described above).

In determining beam failure of all TRPs in the proposed method, a case in which beam failure occurs sequentially in each TRP may be included. That is, beam failure for each TRP may be determined simultaneously (i.e., at the same BFI reception time), but may also be determined at different BFI reception time. Therefore, if all beam failures for each TRP are determined within a predetermined time interval, a UE can determine beam failures for all TRPs.

For example, when a BFI count for TRP #1 is max and a BFI count for TRP #2 is non-zero (i.e., a value between 1 and max), a UE may determine that TRP #2 is also in a beam failure state. Additionally, a UE may determine beam failure for all TRPs at the time in time and trigger transmission of a PRACH for BFR. Alternatively, a UE may wait for a BFI count for TRP #2 to reach max (within a certain time or period), and when the BFI count for TRP #2 reaches max, the UE may determine beam failure for all TRPs and trigger transmission of a PRACH for BFR. Here, if the BFI count for TRP #2 does not reach max (within a certain time or period) or the BFI counter is reset, a UE may determine that there is a beam failure of a single TRP and transmit a PUCCH and/or a BFR MAC-CE for a BFR (if there is already an assigned UL-SCH).

And/or, for BFI counting, a UE may use both a TRP-specific (i.e., TRP-specific) BFI count and a cell-specific BFI count. In this case, if beam failure occurs for all TRPs (both CORESET pool index (or CORESET group index)) in a BFI count for each TRP (i.e., all TRP-specific BFI counts reach max) and beam failure occurs in a cell-specific BFI count (i.e., cell-specific BFI count reaches max), that is, a UE can perform a cell-specific BFR operation (e.g., PRACH-BFR trigger in the case of SpCell) only for beam failure of all TRPs and cell-specific beam failure.

In other words, if beam failure occurred for at least one TRP according to a BFI count for each TRP (beam failure for one of TRPs and/or beam failure for both TRPs) and beam failure did not occur according to a cell-specific BFI count, a UE can perform a BFRQ operation using a PUCCH-SR resource.

To enable the proposed UE operation, a base station can configure both a PRACH resource and a PUCCH-SR resource for BFRQ use for a UE in an integrated BFR configuration.

In the above-mentioned issue/solution 1/2/3/4, a BFD RS for a specific TRP may be a BFD RS corresponding to a specific CORESET pool index (or/and CORESET group index) within a CC (or cell)/BWP.

In addition, the solution 1/2/3/4 may not be a method only for each issue 1/2/3/4 (i.e., each issue 1/2/3/4 corresponds to one example), and may be used as an operation between a base station and a UE to solve other additional problems. In other words, any one of the above proposed solutions 1/2/3/4 or a combination of more than one solution can be used.

Figure 9:
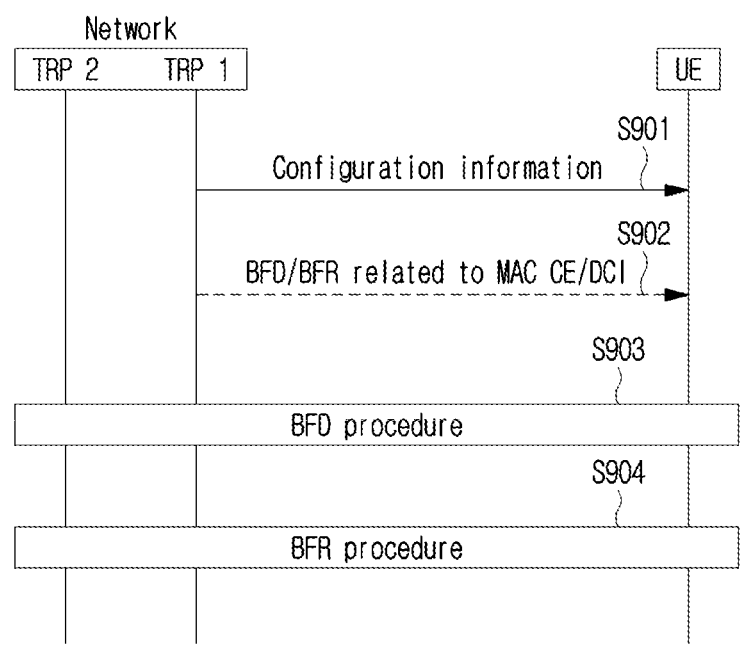
FIG. 9 illustrates a signaling method for an uplink transmission and reception method for beam failure recovery according to an embodiment of the present disclosure.

FIG. 9 illustrates a signaling method for an uplink transmission and reception method for beam failure recovery according to an embodiment of the present disclosure.

FIG. 9 illustrates signaling between a UE and a network (e.g., TRP 1, TRP 2) in a situation of multiple TRPs (i.e., M-TRPs, or multiple cells, hereinafter, all TRPs may be substituted with a cell) that methods proposed in the present disclosure (e.g., any one or a combination of one or more (detailed) embodiments in the detailed embodiments of Proposal 1, the detailed embodiments (solutions) for Embodiments 1 and 2, etc.) may be applied. Here, a UE/a Network is just an example, and may be substituted with a variety of devices and applied. FIG. 9 is just for convenience of a description, and it does not limit a scope of the present disclosure. In addition, some step(s) illustrated in FIG. 9 may be omitted according to a situation and/or a configuration, etc.

In reference to FIG. 9, for convenience of a description, signaling between 2 TRPs and a UE is illustrated, but a corresponding signaling method may be extended and applied to signaling between a plurality of TRPs and a plurality of UEs. In the following description, a network may be one base station including a plurality of TRPs or may be one cell including a plurality of TRPs. In an example, an ideal/a non-ideal backhaul may be configured between TRP 1 and TRP 2 configuring a network. In addition, the following description is described based on a plurality of TRPs, but it may be equally extended and applied to transmission through a plurality of panels. In addition, in the present disclosure, an operation that a terminal receives a signal from TRP1/TRP2 may be interpreted/described (or may be an operation) as an operation that a terminal receives a signal from a network (through/using TRP1/2) and an operation that a terminal transmits a signal to TRP1/TRP2 may be interpreted/described (or may be an operation) as an operation that a terminal transmits a signal to a network (through/using TRP1/TRP2) or may be inversely interpreted/described.

In reference to FIG. 9, a case is assumed that a UE receives a configuration/DCI from a representative TRP (e.g., TRP 1) in a situation of M-TRPs (or a cell, hereinafter, all TRPs may be substituted with a cell/a panel, or a case in which a plurality of CORESETs are configured from one TRP may be assumed as M-TRPs). It is just for convenience of a description, even when a UE receives a configuration/DCI from at least one TRP, a method described below may be extended and applied. In an example, the representative TRP may be a TRP which delivers/transmits to a UE a signal related to a system information block (SIB)/paging/a random access (RA).

A UE may receive configuration information through/using TRP 1 (and/or TRP 2) from a Network (S901).

The configuration information may include information related to a configuration of a network (e.g., a TRP configuration)/M-TRP based transmission and reception (e.g., resource allocation, etc.), etc. In this case, the configuration information may be transmitted through higher layer signaling (e.g., RRC signaling, MAC-CE, etc.).

For example, the configuration information may include configuration information related to a BFD procedure and/or a BFR procedure described in the above-described proposed methods (e.g., any one or a combination of one or more (detailed) embodiments in the detailed embodiments of Proposal 1, the detailed embodiments (solutions) for Embodiments 1 and 2, etc.). In an example, the configuration information may include information on CORESET(s)/CORESET group(s) related to each TRP (e.g., a TCI state(s) configuration related to a CORESET group/a CORESET group identifier (ID), etc.). In an example, the configuration information may include a CORESET configuration. In an example, the configuration information may include information on BFD RS(s)/BFD RS set(s) related to the BFD procedure, and as the case may be, BFD RS(s)/BFD RS set(s) may not be explicitly configured/indicated. In an example, the configuration information may include information on a plurality of RSs (reference signal) for a spatial relation assumption (e.g., a QCL relation) configured for a specific CORESET (/CORESET group) (i.e., a RS or a QCL type D RS that a QCL related to a spatial Rx parameter is configured). In an example, the configuration information may include configuration information on a BFRQ resource related to the BFR procedure.

For example, in a multi-TRP based transmission/reception operation, the configuration information may include information on BFD RS(s)/BFD RS set(s) associated with the BFD procedure associated with each TRP (for a specific cell or cell group). Additionally, the configuration information may include information on a PUCCH resource related to the BFR procedure associated with each TRP (for a specific cell or cell group). For example, the configuration information may include information on a first BFR RS set (including one or more RS) corresponding to TRP 1 and a second BFR RS set (including one or more RS) corresponding to TRP 2. Alternatively, the configuration information may not include explicit information on the first BFR RS set and the second BFR RS set. In this case, for example, a UE may determine the first BFR RS set and the second BFR RS set, respectively, including QCL (quasi co-location) RSs for spatial reception parameters configured in control resource sets (CORESETs) having different control resource set pool indexes. Additionally, the configuration information may include information on a first PUCCH resource for BFR corresponding to TRP 1 and a second PUCCH resource for BFR corresponding to TRP 2, for a TRP-specific BFR procedure. Additionally, the configuration information may include information on a PRACH resource for BFR, for a cell-specific BFR procedure.

A UE may receive BFD/BFR related information through MAC-CE and/or DCI through/with TRP 1 (and/or TRP 2) from a Network (S902). For example, as in the above-described proposed methods (e.g., any one or a combination of one or more (detailed) embodiments in the detailed embodiments of Proposal 1, the detailed embodiments (solutions) for Embodiments 1 and 2, etc.), a UE may receive information related to a BFD procedure and/or a BFR procedure through MAC-CE signaling and/or DCI. For example, information indicating/configuring a RS which will be used as a BFD RS among a plurality of RSs (reference signal) for the spatial relation assumption (e.g., a QCL relation) (i.e., a RS or a QCL type D RS that a QCL related to a spatial Rx parameter is configured) may be received through MAC-CE and/or DCI.

A UE may perform a BFR procedure with a Network (via/using TRP 1 and/or TRP 2) (S903). For example, a UE may perform the BFD procedure based on the proposed methods described above (e.g., any one or a combination of one or more (detailed) embodiments in the detailed embodiments of Proposal 1, the detailed embodiments (solutions) for Embodiments 1 and 2, etc.). For example, a UE may perform a BFD procedure based on BFD RS (or BFR RS).

A UE may receive RSs included in each of a first BFR RS set (explicitly or implicitly configured) corresponding to a first TRP and a second BFR RS set (explicitly or implicitly configured) corresponding to a second TRP and may assess radio link quality for the received RSs. Here, assessing radio link quality may mean comparing a hypothetical BLER (or SINR, RSRP) for each RS with a threshold as described above. In addition, a UE may count a first BFI and a second BFI, respectively, according to an assessment of radio link quality (increment a BFI value by 1 when radio link quality is worse than a predefined threshold). And, when a count value for a first BFI and/or a count value for a second BFI reaches the maximum value, a UE may determine that first beam failure and/or second beam failure has been detected. That is, a UE can individually assess radio link quality for each TRP, count a BFI individually for each TRP, and individually determine for each TRP whether beam failure has been detected.

Here, when both the first beam failure and the second beam failure are detected, a UE may determine that cell-specific beam failure has been detected in a corresponding cell (or CC)/BWP. For example, based on one of the first beam failure and the second beam failure being detected and then the other being detected within a specific time (prefixed or configured by a base station), a UE may determine that cell-specific beam failure has been detected in a corresponding cell (or CC)/BWP.

Here, when one of a counter value for the first BFI and a counter value for the second BFI reaches the maximum value, if the other counter value is not 0, after determining whether the other counter value reaches the maximum value or is reset within the specific time (i.e., after waiting), uplink transmission for BFR may be initiated.

Alternatively, a UE may count a third BFI according to an assessment of radio link quality for a cell-specific RS set to detect cell-specific beam failure (increment a BFI value by 1 when radio link quality is worse than a predefined threshold). And, when a count value for a third BFI reaches the maximum value, a UE may determine that third beam failure (i.e., cell-specific beam failure) has been detected.

Here, the third BFR RS set may be determined as a union of the first BFR RS set and the second BFR RS set. Alternatively, the third BFR RS set is determined as a subset of the union of the first BFR RS set and the second BFR RS set, and the third BFR RS set may include at least one RS from each of the first BFR RS set and the second BFR RS set.

A UE may perform a BFR procedure with a Network (via/using TRP 1 and/or TRP 2) (S904). For example, a UE may perform a BFR procedure based on the proposed methods described above (e.g., any one or a combination of one or more (detailed) embodiments in the detailed embodiments of Proposal 1, the detailed embodiments (solutions) for Embodiments 1 and 2, etc.).

As described above, a UE can individually determine detection of beam failure for each TRP. Additionally, a BFR procedure can be performed for each TRP in which a beam failure is detected. When either the first beam failure or the second beam failure is detected, a UE may perform uplink transmission (i.e., BFR request or link recovery request) on a corresponding PUCCH resource among the first PUCCH resource and the second PUCCH resource.

Additionally, if a UE determines that cell-specific beam failure is detected in a corresponding cell (or CC)/BWP (e.g., after one of the first beam failure and the second beam failure is detected, the other is detected within a specific time), a UE may perform the uplink transmission (i.e., BFR request or link recovery request) on the PRACH resource.

Here, as described above, when one of a counter value for the first BFI and a counter value for the second BFI reaches the maximum value, if the other counter value is not 0, after determining whether the other counter value reaches the maximum value or is reset within the specific time (i.e., after waiting), uplink transmission for BFR may be initiated. Here, when a value of the other counter reaches the maximum value within the specific time, a UE may determine that cell-specific beam failure has been detected and perform the uplink transmission (i.e., BFR request or link recovery request) on the PRACH resource. On the other hand, based on the other counter value being reset within the specific time, a UE may determine that TRP-specific beam failure has been detected and perform the uplink transmission (i.e., BFR request or link recovery request) on the corresponding PUCCH resource among the first and second PUCCH resources.

Alternatively, as described above, a UE may count a third BFI according to an assessment of radio link quality for a cell-specific RS set to detect cell-specific beam failure. In this case, if both the first beam failure and the second beam failure are detected and third beam failure is detected by counting a third BFI according to an assessment of radio link quality for a third BFR RS set, a UE may perform the uplink transmission (i.e., BFR request or link recovery request) on the PRACH resource.

On the other hand, if there is a PUSCH (already allocated) available to a UE, the UE may omit uplink transmission (i.e., BFR request or link recovery request) through the PUCCH and transmit a BFR MAC CE to a base station through the corresponding PUSCH. That is, a transmission operation of the uplink transmission (i.e., BFR request or link recovery request) may be omitted.

Beam failure may be declared by a UE that has assessed radio link quality in the above method, and the uplink transmission (i.e., BFR request or link recovery request) may be performed. In addition, a network that received the uplink transmission (i.e., BFR request or link recovery request) may perform beam recovery for each TRP or each cell (or CC) through various processes such as beam RS transmission and beam reporting request, etc.

Figure 10:
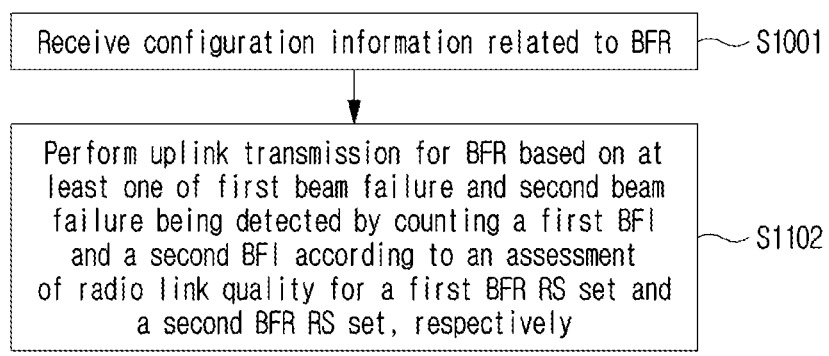
FIG. 10 is a diagram illustrating an operation of a terminal in an uplink transmission method for beam failure recovery according to an embodiment of the present disclosure.

FIG. 10 is a diagram illustrating an operation of a terminal in an uplink transmission method for beam failure recovery according to an embodiment of the present disclosure.

FIG. 10 illustrates an operation of a terminal based on the proposed methods (e.g., any one or a combination of one or more (detailed) embodiments in the detailed embodiments of Proposal 1, the detailed embodiments (solutions) for Embodiments 1 and 2, etc.). An example in FIG. 10 is for convenience of a description, and it does not limit a scope of the present disclosure. Some step(s) illustrated in FIG. 10 may be omitted according to a situation and/or a configuration. In addition, in FIG. 10, a UE is just one example, and may be implemented by a device illustrated in the following FIG. 12. For example, a processor 102/202 in FIG. 12 may control to transmit and receive a channel/a signal/data/information, etc. by using a transceiver 106/206 and may also control to store a channel/a signal/data/information, etc. which will be transmitted or received in a memory 104/204.

In addition, an operation in FIG. 10 may be processed by one or more processors 102 and 202 in FIG. 12 and an operation in FIG. 10 may be stored in a memory (e.g., one or more memories (104, 204) in FIG. 12) in a form of a command/a program (e.g., an instruction, an executable code) for operating at least one processor (e.g., 102, 202) in FIG. 12.

Referring to FIG. 10, a UE receives configuration information related to BFR from a base station (S1001).

The configuration information may include configuration information related to a BFD procedure and/or a BFR procedure described in the above-described proposed methods (e.g., any one or a combination of one or more (detailed) embodiments in the detailed embodiments of Proposal 1, the detailed embodiments (solutions) for Embodiments 1 and 2, etc.). In an example, the configuration information may include information on CORESET(s)/CORESET group(s) related to each TRP (e.g., a TCI state(s) configuration related to a CORESET group/a CORESET group identifier (ID), etc.). In an example, the configuration information may include a CORESET configuration. In an example, the configuration information may include information on BFD RS(s)/BFD RS set(s) related to the BFD procedure, and as the case may be, BFD RS(s)/BFD RS set(s) may not be explicitly configured/indicated. In an example, the configuration information may include information on a plurality of RSs (reference signal) for a spatial relation assumption (e.g., a QCL relation) configured for a specific CORESET (/CORESET group) (i.e., a RS or a QCL type D RS that a QCL related to a spatial Rx parameter is configured). In an example, the configuration information may include configuration information on a BFRQ resource related to the BFR procedure.

For example, in a multi-TRP based transmission/reception operation, the configuration information may include information on BFD RS(s)/BFD RS set(s) associated with the BFD procedure associated with each TRP (for a specific cell or cell group). Additionally, the configuration information may include information on a PUCCH resource related to the BFR procedure associated with each TRP (for a specific cell or cell group). For example, the configuration information may include information on a first BFR RS set (including one or more RS) corresponding to TRP 1 and a second BFR RS set (including one or more RS) corresponding to TRP 2. Alternatively, the configuration information may not include explicit information on the first BFR RS set and the second BFR RS set. In this case, for example, a UE may determine the first BFR RS set and the second BFR RS set, respectively, including QCL (quasi co-location) RSs for spatial reception parameters configured in control resource sets (CORESETs) having different control resource set pool indexes. Additionally, the configuration information may include information on a first PUCCH resource for BFR corresponding to TRP 1 and a second PUCCH resource for BFR corresponding to TRP 2, for a TRP-specific BFR procedure. Additionally, the configuration information may include information on a PRACH resource for BFR, for a cell-specific BFR procedure.

Meanwhile, although not shown in FIG. 10, a UE may receive information related to a BFD procedure and/or BFR procedure from a base station through MAC-CE signaling and/or DCI.

Based on at least one of first beam failure and second beam failure being detected by counting a first BFI and a second BFI, respectively, according to an assessment of radio link quality for a first BFR RS set and a second BFR RS set, a UE performs uplink transmission for BFR to a base station (S1002).

For example, a UE may perform the BFD procedure and the BFR procedure based on the proposed methods described above (e.g., any one or a combination of one or more (detailed) embodiments in the detailed embodiments of Proposal 1, the detailed embodiments (solutions) for Embodiments 1 and 2, etc.).

A UE may receive RSs included in each of a first BFR RS set (explicitly or implicitly configured) corresponding to a first TRP and a second BFR RS set (explicitly or implicitly configured) corresponding to a second TRP and may assess radio link quality for the received RSs. In addition, a UE may count a first BFI and a second BFI, respectively, according to an assessment of radio link quality (increment a BFI value by 1 when radio link quality is worse than a predefined threshold). And, when a count value for a first BFI and/or a count value for a second BFI reaches the maximum value, a UE may determine that first beam failure and/or second beam failure has been detected. That is, a UE can individually assess radio link quality for each TRP, count a BFI individually for each TRP, and individually determine for each TRP whether beam failure has been detected. And, when either the first beam failure or the second beam failure is detected, a UE may perform the uplink transmission (i.e., BFR request or link recovery request) on the corresponding PUCCH resource among the first PUCCH resource and the second PUCCH resource.

Here, when both the first beam failure and the second beam failure are detected, a UE may determine that cell-specific beam failure has been detected in a corresponding cell (or CC)/BWP. For example, based on one of the first beam failure and the second beam failure being detected and then the other being detected within a specific time (prefixed or configured by a base station), a UE may determine that cell-specific beam failure has been detected in a corresponding cell (or CC)/BWP. If a UE determines that cell-specific beam failure is detected in the corresponding cell (or CC)/BWP (e.g., after one of the first beam failure and the second beam failure is detected, the other is detected within a specific time), the UE may perform the uplink transmission (i.e., BFR request or link recovery request) on the PRACH resource.

Here, when one of a counter value for the first BFI and a counter value for the second BFI reaches the maximum value, if the other counter value is not 0, after determining whether the other counter value reaches the maximum value or is reset within the specific time (i.e., after waiting), uplink transmission for BFR may be initiated. Here, when a value of the other counter reaches the maximum value within the specific time, a UE may determine that cell-specific beam failure has been detected and perform the uplink transmission (i.e., BFR request or link recovery request) on the PRACH resource. On the other hand, based on a value of the other counter being reset within the specific time, a UE may determine that TRP-specific beam failure has been detected and perform the uplink transmission (i.e., BFR request or link recovery request) on the corresponding PUCCH resource among the first and second PUCCH resources.

Alternatively, a UE may count a third BFI according to an assessment of radio link quality for a cell-specific RS set to detect cell-specific beam failure (increment a BFI value by 1 when radio link quality is worse than a predefined threshold). And, when a count value for a third BFI reaches the maximum value, a UE may determine that third beam failure (i.e., cell-specific beam failure) has been detected. In this case, if both the first beam failure and the second beam failure are detected and third beam failure is detected by counting a third BFI according to an assessment of radio link quality for a third BFR RS set, a UE may perform the uplink transmission (i.e., BFR request or link recovery request) on the PRACH resource.

Here, the third BFR RS set may be determined as a union of the first BFR RS set and the second BFR RS set. Alternatively, the third BFR RS set is determined as a subset of the union of the first BFR RS set and the second BFR RS set, and the third BFR RS set may include at least one RS from each of the first BFR RS set and the second BFR RS set.

On the other hand, if there is a PUSCH (already allocated) available to a UE, the UE may omit uplink transmission (i.e., BFR request or link recovery request) through the PUCCH and transmit a BFR MAC CE to a base station through the corresponding PUSCH. That is, a transmission operation of the uplink transmission (i.e., BFR request or link recovery request) may be omitted.

Beam failure may be declared by a UE that has assessed radio link quality in the above method, and the uplink transmission (i.e., BFR request or link recovery request) may be performed. In addition, a network that received the uplink transmission (i.e., BFR request or link recovery request) may perform beam recovery for each TRP or each cell (or CC) through various processes such as beam RS transmission and beam reporting request, etc.

Figure 11:
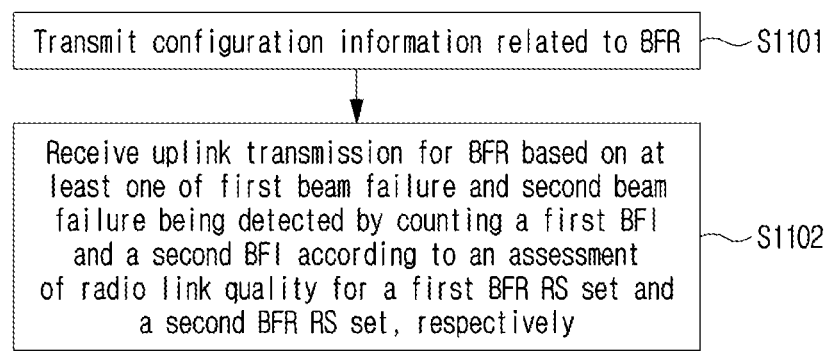
FIG. 11 is a diagram illustrating an operation of a base station for an uplink transmission method for beam failure recovery according to an embodiment of the present disclosure.

FIG. 11 is a diagram illustrating an operation of a base station for an uplink transmission method for beam failure recovery according to an embodiment of the present disclosure.

In reference to FIG. 11, FIG. 11 illustrates an operation of a base station based on the proposed methods described above (e.g., any one or a combination of one or more (detailed) embodiments in the detailed embodiments of Proposal 1, the detailed embodiments (solutions) for Embodiments 1 and 2, etc.). An example in FIG. 11 is for convenience of a description, and it does not limit a scope of the present disclosure. Some step(s) illustrated in FIG. 11 may be omitted according to a situation and/or a configuration. In addition, in FIG. 11, a base station is just one example, and may be implemented by a device illustrated in the following FIG. 12. For example, a processor 102/202 in FIG. 12 may control to transmit and receive a channel/a signal/data/information, etc. by using a transceiver 106/206 and may control to store a channel/a signal/data/information, etc. which will be transmitted or received in a memory 104/204.

In addition, an operation in FIG. 11 may be processed by one or more processors 102 and 202 in FIG. 12 and an operation in FIG. 11 may be stored in a memory (e.g., one or more memories (104, 204) in FIG. 12) in a form of a command/a program (e.g., an instruction, an executable code) for operating at least one processor (e.g., 102, 202) in FIG. 12.

Referring to FIG. 11, a base station transmits configuration information related to BFR to a UE (S1101).

The configuration information may include configuration information related to a BFD procedure and/or a BFR procedure described in the above-described proposed methods (e.g., any one or a combination of one or more (detailed) embodiments in the detailed embodiments of Proposal 1, the detailed embodiments (solutions) for Embodiments 1 and 2, etc.). In an example, the configuration information may include information on CORESET(s)/CORESET group(s) related to each TRP (e.g., a TCI state(s) configuration related to a CORESET group/a CORESET group identifier (ID), etc.). In an example, the configuration information may include a CORESET configuration. In an example, the configuration information may include information on BFD RS(s)/BFD RS set(s) related to the BFD procedure, and as the case may be, BFD RS(s)/BFD RS set(s) may not be explicitly configured/indicated. In an example, the configuration information may include information on a plurality of RSs (reference signal) for a spatial relation assumption (e.g., a QCL relation) configured for a specific CORESET (/CORESET group) (i.e., a RS or a QCL type D RS that a QCL related to a spatial Rx parameter is configured). In an example, the configuration information may include configuration information on a BFRQ resource related to the BFR procedure.

For example, in a multi-TRP based transmission/reception operation, the configuration information may include information on BFD RS(s)/BFD RS set(s) associated with the BFD procedure associated with each TRP (for a specific cell or cell group). Additionally, the configuration information may include information on a PUCCH resource related to the BFR procedure associated with each TRP (for a specific cell or cell group). For example, the configuration information may include information on a first BFR RS set (including one or more RS) corresponding to TRP 1 and a second BFR RS set (including one or more RS) corresponding to TRP 2. Alternatively, the configuration information may not include explicit information on the first BFR RS set and the second BFR RS set. In this case, for example, a UE may determine the first BFR RS set and the second BFR RS set, respectively, including QCL (quasi co-location) RSs for spatial reception parameters configured in control resource sets (CORESETs) having different control resource set pool indexes. Additionally, the configuration information may include information on a first PUCCH resource for BFR corresponding to TRP 1 and a second PUCCH resource for BFR corresponding to TRP 2, for a TRP-specific BFR procedure. Additionally, the configuration information may include information on a PRACH resource for BFR, for a cell-specific BFR procedure.

Meanwhile, although not shown in FIG. 10, a base station may transmit information related to a BFD procedure and/or BFR procedure to a UE through MAC-CE signaling and/or DCI.

Based on at least one of first beam failure and second beam failure being detected by counting a first BFI and a second BFI, respectively, according to an assessment of radio link quality for a first BFR RS set and a second BFR RS set, a base station receives uplink transmission for BFR from a UE (S1102).

For example, the BFD procedure and the BFR procedure may be performed based on the proposed methods described above (e.g., any one or a combination of one or more (detailed) embodiments in the detailed embodiments of Proposal 1, the detailed embodiments (solutions) for Embodiments 1 and 2, etc.).

A base station may transmit, to a UE, RSs included in each of a first BFR RS set (explicitly or implicitly configured) corresponding to a first TRP and a second BFR RS set (explicitly or implicitly configured) corresponding to a second TRP and radio link quality for the transmitted RS may be assessed. In addition, a first BFI and a second BFI may be counted, respectively, according to an assessment of radio link quality (increment a BFI value by 1 when radio link quality is worse than a predefined threshold). And, when a count value for a first BFI and/or a count value for a second BFI reaches the maximum value, it may be determined that first beam failure and/or second beam failure has been detected. That is, radio link quality for each TRP may be individually assessed, a BFI may be counted individually for each TRP, and whether beam failure has been detected may be individually determined for each TRP. And, when either the first beam failure or the second beam failure is detected, a base station may receive the uplink transmission (i.e., BFR request or link recovery request) on the corresponding PUCCH resource among the first PUCCH resource and the second PUCCH resource.

Here, when both the first beam failure and the second beam failure are detected, it may be determined that cell-specific beam failure has been detected in a corresponding cell (or CC)/BWP. For example, based on one of the first beam failure and the second beam failure being detected and then the other being detected within a specific time (prefixed or configured by a base station), it may be determined that cell-specific beam failure has been detected in a corresponding cell (or CC)/BWP. If it is determined that cell-specific beam failure is detected in the corresponding cell (or CC)/BWP (e.g., after one of the first beam failure and the second beam failure is detected, the other is detected within a specific time), a base station may receive the uplink transmission (i.e., BFR request or link recovery request) on the PRACH resource.

Here, when one of a counter value for the first BFI and a counter value for the second BFI reaches the maximum value, if the other counter value is not 0, after determining whether the other counter value reaches the maximum value or is reset within the specific time (i.e., after waiting), uplink transmission for BFR may be initiated. Here, when a value of the other counter reaches the maximum value within the specific time, it may be determined that cell-specific beam failure has been detected and a base station may receive the uplink transmission (i.e., BFR request or link recovery request) on the PRACH resource. On the other hand, based on a value of the other counter being reset within the specific time, it may be determined that TRP-specific beam failure has been detected and a base station may receive the uplink transmission (i.e., BFR request or link recovery request) on the corresponding PUCCH resource among the first and second PUCCH resources.

Alternatively, a third BFI may be counted according to an assessment of radio link quality for a cell-specific RS set to detect cell-specific beam failure (increment a BFI value by 1 when radio link quality is worse than a predefined threshold). And, when a count value for a third BFI reaches the maximum value, it may be determined that third beam failure (i.e., cell-specific beam failure) has been detected. In this case, if both the first beam failure and the second beam failure are detected and third beam failure is detected by counting a third BFI according to an assessment of radio link quality for a third BFR RS set, a base station may receive the uplink transmission (i.e., BFR request or link recovery request) on the PRACH resource.

Here, the third BFR RS set may be determined as a union of the first BFR RS set and the second BFR RS set. Alternatively, the third BFR RS set is determined as a subset of the union of the first BFR RS set and the second BFR RS set, and the third BFR RS set may include at least one RS from each of the first BFR RS set and the second BFR RS set.

On the other hand, if there is a PUSCH (already allocated) available to a UE, the UE may omit uplink transmission (i.e., BFR request or link recovery request) through the PUCCH and a base station may receive a BFR MAC CE from a UE through the corresponding PUSCH. That is, a transmission operation of the uplink transmission (i.e., BFR request or link recovery request) may be omitted.

Beam failure may be declared by a UE that has assessed radio link quality in the above method, and the uplink transmission (i.e., BFR request or link recovery request) may be performed. In addition, a network that received the uplink transmission (i.e., BFR request or link recovery request) may perform beam recovery for each TRP or each cell (or CC) through various processes such as beam RS transmission and beam reporting request, etc.

General Device to which the Present Disclosure May be Applied

FIG. 12 is a diagram which illustrates a block diagram of a wireless communication device according to an embodiment of the present disclosure.

In reference to FIG. 12, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IOT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A. 5G system, but may be applied to various wireless communication systems other than the 3GPP LTE/LTE-A. 5G system.

The invention claimed is:

1. A method of uplink transmission for beam failure recovery (BFR) in a wireless communication system, the method performed by a terminal comprising:
   receiving, from a base station, configuration information related to BFR; and
   based on at least one of first beam failure and second beam failure being detected by counting a first beam failure instance (BFI) and a second BFI according to an assessment of radio link quality for a first BFR reference signal (RS) set and a second BFR RS set, respectively, performing, to the base station, uplink transmission for BFR, wherein the configuration information includes information on a first PUCCH (physical uplink control channel) resource for BFR corresponding to the first BFR RS set, a second PUCCH resource for BFR corresponding to the second BFR RS set, and a PRACH (physical random access channel) resource for BFR, wherein based on whether one of the first beam failure and the second beam failure is detected, the uplink transmission is performed on a corresponding PUCCH resource among the first PUCCH resource and the second PUCCH resource, and wherein based on one of the first beam failure and the second beam failure being detected and then the other being detected within a specific time, the uplink transmission is performed on the PRACH resource.

2. The method of claim 1, wherein based on a counter value for the first BFI and a counter value for the second BFI reaching a maximum value, the first beam failure and the second beam failure are detected, respectively.

3. The method of claim 2, wherein based on one of the counter value for the first BFI and the counter value for the second BFI reaching the maximum value and the other counter value being not 0, uplink transmission is initiated after determining whether the other counter value reaches the maximum value or is reset within the specific time.

4. The method of claim 3, wherein based on the other counter value reaching the maximum value within the specific time, the uplink transmission is performed on the PRACH resource.

5. The method of claim 3, wherein based on the other counter value being reset within the specific time, the uplink transmission is performed on a corresponding PUCCH resource among the first PUCCH resource and the second PUCCH resource.

6. The method of claim 1, wherein the first BFR RS set and the second BFR RS set includes a QCL (quasi co-location) RS for spatial reception parameters configured in control resource sets (CORESETs) having different CORESET pool indexes.

7. The method of claim 1, wherein the first BFR RS set and the second BFR RS set are configured by higher layer signaling by the base station, respectively.

8. The method of claim 1, wherein based on third beam failure being detected by both the first beam failure and the second beam failure being detected and a third BFI being counted according to an assessment of radio link quality for a third BFR RS set, the uplink transmission is performed on the PRACH resource.

9. The method of claim 8, wherein the third BFR RS set is a union of the first BFR RS set and the second BFR RS set.

10. The method of claim 8, wherein the third BFR RS set is a subset of a union of the first BFR RS set and the second BFR RS set, and wherein the third BFR RS set includes at least one RS from each of the first BFR RS set and the second BFR RS set.

11. A terminal of uplink transmission for beam failure recovery (BFR) in a wireless communication system, the terminal comprising:

at least one transceiver for transmitting and receiving a wireless signal; and at least one processor for controlling the at least one transceiver, wherein the at least one processor configured to:

receive, from a base station, configuration information related to BFR; and based on at least one of first beam failure and second beam failure being detected by counting a first beam failure instance (BFI) and a second BFI according to an assessment of radio link quality for a first BFR reference signal (RS) set and a second BFR RS set, respectively, perform, to the base station, uplink transmission for BFR, wherein the configuration information includes information on a first PUCCH (physical uplink control channel) resource for BFR corresponding to the first BFR RS set, a second PUCCH resource for BFR corresponding to the second BFR RS set, and a PRACH (physical random access channel) resource for BFR, wherein based on whether one of the first beam failure and the second beam failure is detected, the uplink transmission is performed on a corresponding PUCCH resource among the first PUCCH resource and the second PUCCH resource, and wherein based on one of the first beam failure and the second beam failure being detected and then the other being detected within a specific time, the uplink transmission is performed on the PRACH resource.

12. A base station of receiving uplink transmission for beam failure recovery (BFR) in a wireless communication system, the base station comprising:

at least one transceiver for transmitting and receiving a wireless signal; and at least one processor for controlling the at least one transceiver, wherein the at least one processor configured to:

transmit, to a terminal, configuration information related to BFR; and based on at least one of first beam failure and second beam failure being detected by counting a first beam failure instance (BFI) and a second BFI according to an assessment of radio link quality for a first BFR reference signal (RS) set and a second BFR RS set, respectively, receive, from the terminal, uplink transmission for BFR, wherein the configuration information includes information on a first PUCCH (physical uplink control channel) resource for BFR corresponding to the first BFR RS set, a second PUCCH resource for BFR corresponding to the second BFR RS set, and a PRACH (physical random access channel) resource for BFR, wherein based on whether one of the first beam failure and the second beam failure is detected, the uplink transmission is performed on a corresponding PUCCH resource among the first PUCCH resource and the second PUCCH resource, and wherein based on one of the first beam failure and the second beam failure being detected and then the other being detected within a specific time, the uplink transmission is performed on the PRACH resource.

* * * * *